(12) United States Patent
Tumkur Shivanand et al.

(10) Patent No.: US 11,093,143 B2
(45) Date of Patent: Aug. 17, 2021

(54) METHODS AND SYSTEMS FOR MANAGING KEY-VALUE SOLID STATE DRIVES (KV SSDS)

(71) Applicant: Samsung Electronics Co., Ltd., Suwon-si (KR)

(72) Inventors: Srikanth Tumkur Shivanand, Tumkur (IN); Vikram Singh, Bangalore (IN); Paul Justin K, Chennai (IN); Jayantha Gopala, Bangalore (IN); Kapil Garg, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 63 days.

(21) Appl. No.: 16/569,907

(22) Filed: Sep. 13, 2019

(65) Prior Publication Data
US 2021/0011634 A1    Jan. 14, 2021

(30) Foreign Application Priority Data

Jul. 12, 2019   (IN) .............................. 201941028111

(51) Int. Cl.
*G06F 12/00*  (2006.01)
*G06F 3/06*   (2006.01)
*H04L 9/30*   (2006.01)
*H04L 9/08*   (2006.01)

(52) U.S. Cl.
CPC .......... *G06F 3/0622* (2013.01); *G06F 3/0653* (2013.01); *G06F 3/0688* (2013.01); *H04L 9/0825* (2013.01); *H04L 9/3073* (2013.01)

(58) Field of Classification Search
CPC .... G06F 3/0622; G06F 3/0653; G06F 3/0688; G06F 12/0238; G06F 12/0246; G06F 3/0683; G06F 3/0689; H04L 9/0825; H04L 9/3073
See application file for complete search history.

(56) References Cited

U.S. PATENT DOCUMENTS

| | | | |
|---|---|---|---|
| 8,429,346 B1 * | 4/2013 | Chen ..................... | G06F 3/0649 711/114 |
| 9,720,601 B2 | 8/2017 | Gupta et al. | |
| 2014/0082276 A1 | 3/2014 | Suzuki et al. | |
| 2015/0074341 A1 | 3/2015 | Marukame et al. | |
| 2017/0031959 A1 * | 2/2017 | Zayas ................... | G06F 3/0685 |

* cited by examiner

*Primary Examiner* — Shawn X Gu
(74) *Attorney, Agent, or Firm* — Harness, Dickey & Pierce, P.L.C.

(57) ABSTRACT

Methods and systems for managing Key-Value Solid State Drives (KV SSDs). A method includes writing, by a host processor, at least one Key-value pair of at least one write command to at least one KV SSD of a plurality of KV SSDs of at least one RAID group based on at least one of slab information, available space and load. Further, the method includes reading, by the host processor, at least one value from the at least one KV SSD of the plurality of KV SSDs for at least one key of at least one read command using at least one of a consistent hashing function and slab information.

20 Claims, 16 Drawing Sheets

METHODS AND SYSTEMS FOR MANAGING KEY-VALUE SOLID STATE DRIVES (KV SSDS)

CROSS-REFERENCE TO RELATED APPLICATION

This application claims priority from Indian Patent Application No. 201941028111 filed on Jul. 12, 2019 in the India Intellectual Property Office, and all the benefits accruing therefrom under 35 U.S.C. 119, the contents of which in its entirety are herein incorporated by reference.

BACKGROUND

Technical Field

The present disclosure relates to the field of Key-Value Solid State Drives (KV SSDs). For example, at least some example embodiments relate to realizing Quality of Service (QoS) in KV SSDs.

Description of the Related Art

Key-Value Solid State Drives (KV SSDs) incorporate Key-Value store logic to store data of a file/directory in one or more Key-Value pairs. Due to incorporation of the Key-Value store logic, the KV SSDs can respond to direct data requests from a host application with minimal involvement of host software. Each Key-Value pair may include a name of the file/directory and an identifier of a container associated with the file/directory as a value. In conventional approaches, the host application stores the Key-Value pairs in the KV SSDs randomly due to variable key length and value size. Random storage of the key-Value pairs can result in uneven loading of the KV SSDs and inefficient bandwidth utilization.

Further, the KV SSDs may include multiple Flash Translation Layers (FTLs) which can store the data/Key-Value pairs received from the host application in memory pages. In the conventional approaches, there can be a scenario, wherein number of the key-Value pairs stored in a particular FTL is huge compared to other FTLs. This can result in uneven read and write speed.

SUMMARY

Example embodiments herein disclose methods and systems for efficiently managing Key-Value Solid State Drives (KV SSDs) based on load balancing and space availability.

Some example embodiments herein disclose methods and systems for creating a plurality of Redundant Array of Independent Disks (RAID) groups for a cluster of KV SSDs, wherein a host processor is connected to at least one RAID group of the plurality of RAID groups and the at least one RAID group includes a plurality of KV SSDs.

Some example embodiments herein disclose methods and systems for writing at least one Key-Value pair of a write command to at least one KV SSD selected from the plurality of KV SSDs, wherein the at least one KV SSD is selected based on load, available space and slab information.

Some example embodiments herein disclose methods and systems for writing the at least one Key-Value pair of the write command to the selected at least one KV SSD by splitting a size of at least one value of the at least one Key-Value pair of the write command.

Some example embodiments herein disclose methods and systems for reading at least one value for at least one key of a read command by broadcasting the at least one key of the read command to the at least one KV SSD selected from the plurality of KV SSDs.

Some example embodiments herein disclose methods and systems for writing the at least one Key-Value pair received from the host processor to at least one Flash Translation Layer (FTL) core selected from a plurality of FTL cores of the at least one KV SSD, wherein the at least one FTL core is selected based on load, available space and slab information.

Some example embodiments herein disclose methods and systems for writing the at least one Key-Value pair received from the host processor to the selected at least one FTL core by splitting a size of at least one value of the at least one Key-Value pair.

Some example embodiments herein disclose methods and systems for reading the at least one value for the at least one key received from the host processor by broadcasting the at least one key to the at least one FTL core selected from the plurality of FTL cores of the at least one KV SSD.

Accordingly, the example embodiments herein provide methods and systems for efficiently managing Key-Value Solid State Drives (SSDs).

In some example embodiments, a system includes a plurality of Redundant Array of Independent Disks (RAID) groups, the plurality of RAID groups each including a plurality of Key-Value Solid State Drives (KV SSDs); and a host processor coupled to at least one of the plurality of RAID groups, the host processor configured to, write at least one Key-Value pair to at least one of the plurality of KV SSDs based on at least one of (i) slab information, (ii) available space of the at least one KV SSD and (iii) a load of the at least one KV SSD, the at least one Key-Value pair being associated with a write command to write a data to the at least one KV SSD, and read the data from the at least one KV SSD for at least one key of at least one read command based on at least one of a consistent hashing function and the slab information.

In some example embodiments, a method includes writing, by a host processor, at least one Key-Value pair to at least one of a plurality of KV SSDs of at least one Redundant Array of Independent Disks (RAID) group based on at least one of (i) slab information, (ii) available space of the at least one KV SSD and (iii) a load of the at least one KV SSD, the at least one Key-Value pair being associated with a write command to write a data to the at least one KV SSD; and reading, by the host processor, the data from the at least one KV SSD for at least one key of at least one read command based on at least one of a consistent hashing function and the slab information.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Example embodiments herein are illustrated in the accompanying drawings, throughout which like reference letters indicate corresponding parts in the various figures. The example embodiments herein will be better understood from the following description with reference to the drawings, in which.

DETAILED DESCRIPTION

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Figure 1A:
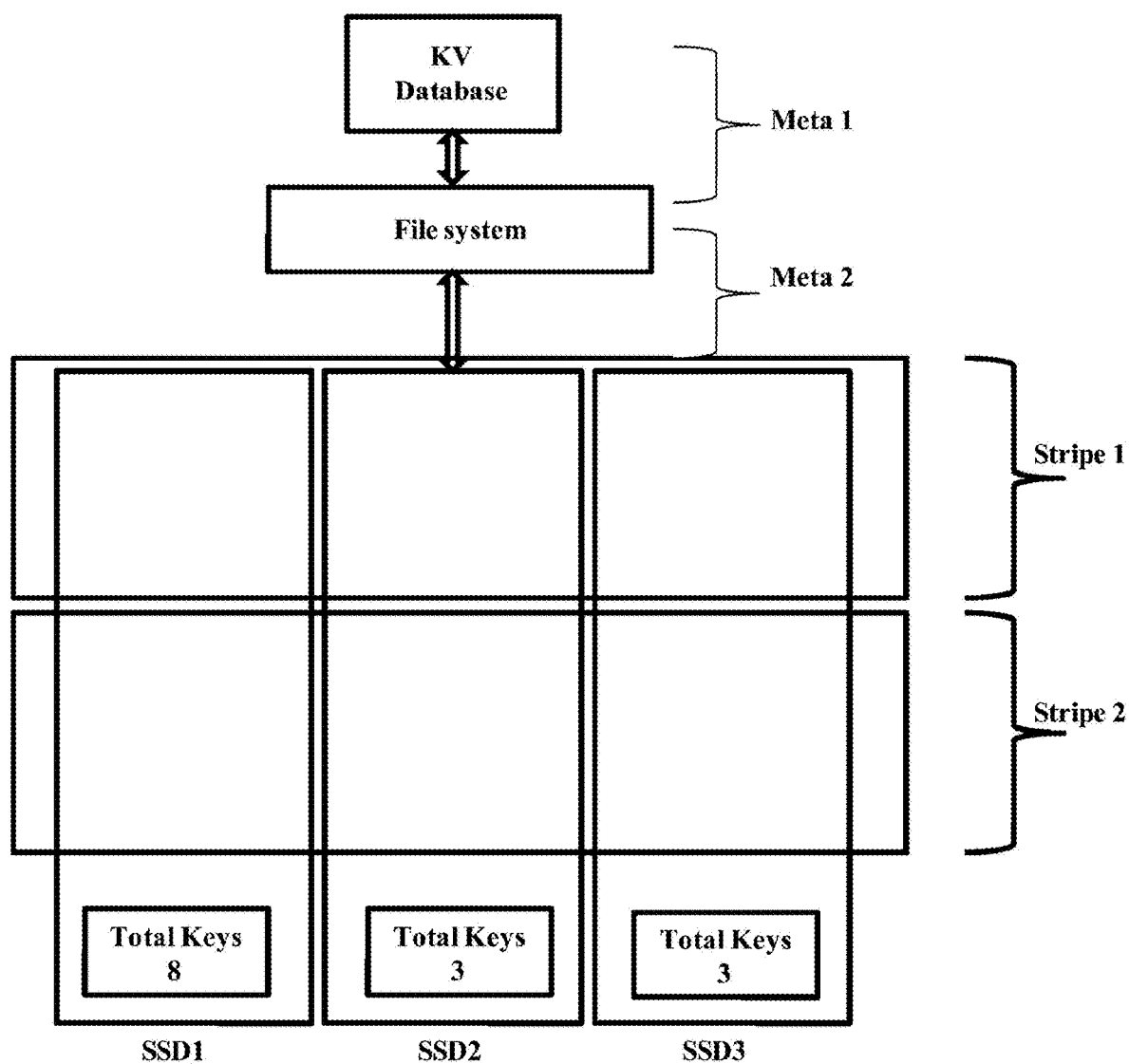
FIGS. 1A and 1B are example diagrams illustrating storage of Key-Value pairs in Key-Value Solid State Drives (KV-SSDs) with uneven load balancing and inefficient bandwidth utilization.
Figure 1B:
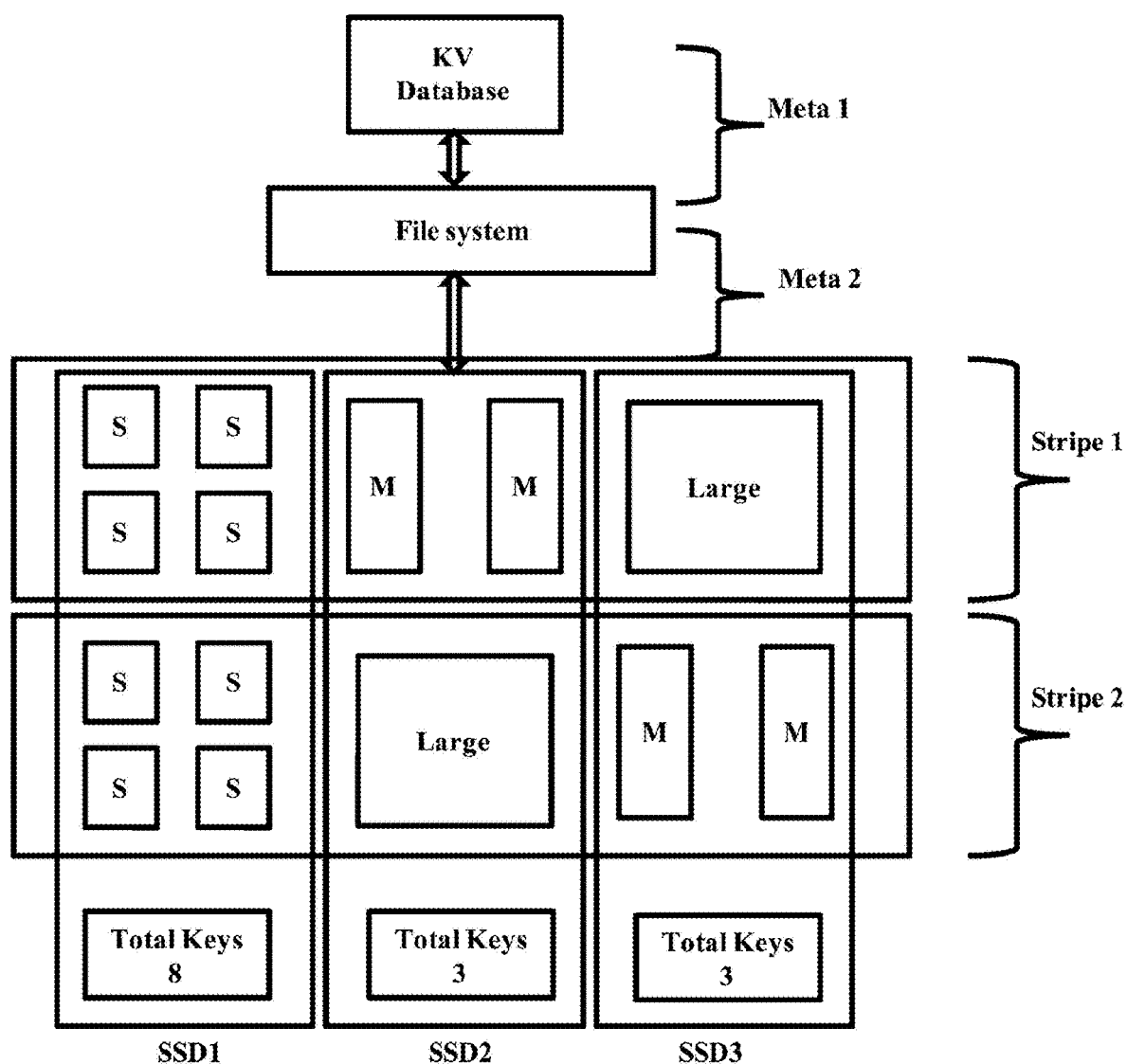

FIGS. 1A and 1B illustrate storage of Key-Value pairs in KV-SSDs with uneven load balancing and inefficient bandwidth utilization. A host application can be connected to multiple KV SSDs for reading/writing data to/from the multiple KV SSDs. In an example herein, the host application can be connected to three KV SSDs. During a write operation, the host application may store the Key-Value pairs of the data in the three KV SSDs randomly by following a sequential/serial order. However, due to the random storage of the Key-Value pairs, there can be a scenario, wherein more data can be stored in a KV SSD-1 and less data can be stored in a KV SSD-2 and a KV SSD-3 as illustrated in FIG. 1A. Further, speed of the write operation can be affected due to the storage of the Key-Value pairs by following the sequential order.

The host application may also store the Key-Value pairs in the three KV SSDs based on the value size. However, higher number of keys may be stored in the KV SSD-1 and smaller number of keys can be stored in the KV SSD-2 and the KV SSD-3 as illustrated in FIG. 1B. Thus, the KV SSD-1 may be overloaded and the KV SSD-2 and the KV SSD-3 may be underutilized/unused. Thus storing of the data in the multiple KV SSDs results in uneven loading of the KV SSDs with respect to Input/Output, number of keys and data utilization.

During a read operation, multiple Input/Output (I/O) requests may fall into a single KV SSD (the overloaded disk) for reading the data, which results in uneven read speed.

Further, the host application may use a two level metadata for writing/reading to/from the KV SSDs. The two level metadata includes a metadata used by a KV database to locate files and metadata in a file system as illustrated in FIGS. 1A and 1B. Thus, there may be a demand for resources on the host application to store the two level metadata.

Example embodiments herein disclose methods and systems for managing Key-Value Solid State Drives (SSDs) based on at least one of load, available space and slab information. Referring now to the drawings, and more particularly to FIGS. 2A through 12, where similar reference characters denote corresponding features consistently throughout the figures, there are shown example embodiments.

Figure 2A:
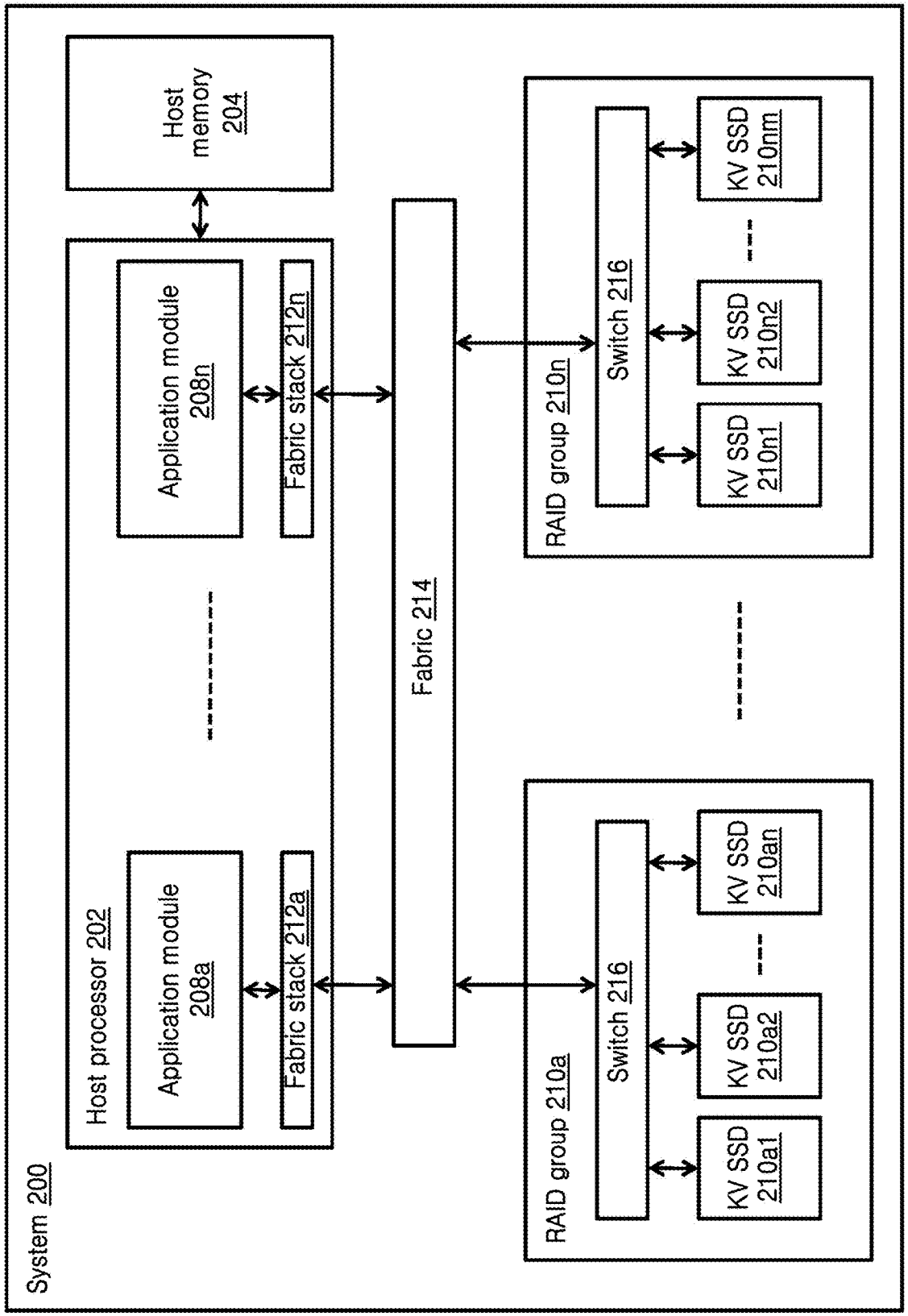
FIGS. 2A and 2B illustrate a system for managing a plurality of KV SSDs, according to example embodiments as disclosed herein.
Figure 2B:
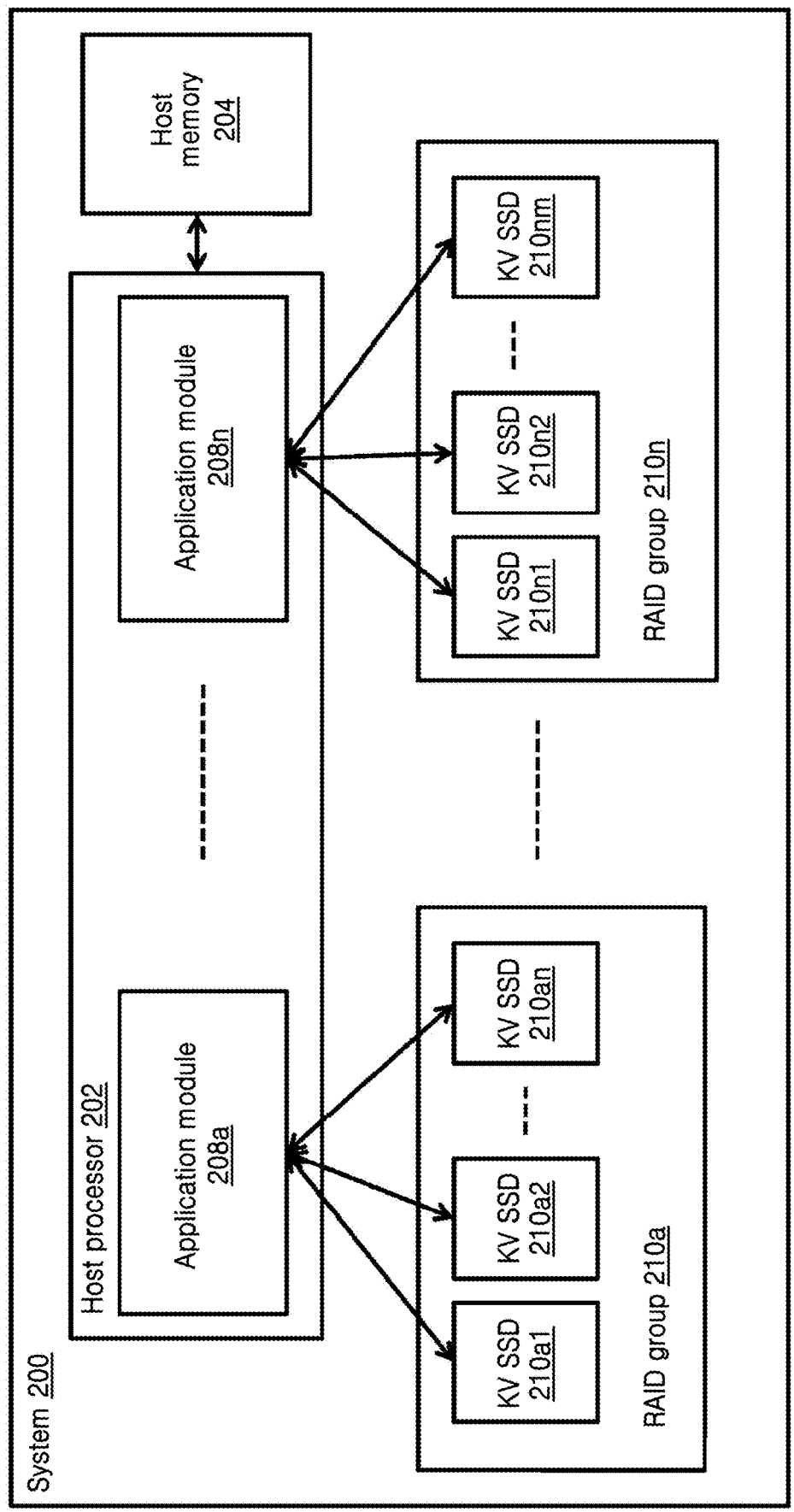

FIGS. 2A and 2B illustrate a system 200 for managing a plurality of Key-Value Solid State Drives (KV SSDs), according to example embodiments as disclosed herein.

Referring to FIGS. 2A and 2B, the system 200 referred herein can be a computing device supporting at least one of KV SSDs, a Non-Volatile Memory Express (NVMe) Fabric, a Key-Value database, a NVMe firmware, an enterprise storage array and so on. Examples of the system 200 can be, but is not limited to, a laptop, a workstation, a personal digital assistant, a smartphone, a tablet, a virtual computing device, a server, a storage server, a file server, a multiprocessor system, a microprocessor based programmable consumer electronics, a network computer, a minicomputer, a mainframe computer, a wearable computing device, an Internet of Things (IoT) device, a vehicle infotainment system, and so on.

The system 200 includes a host processor 202, a host memory 204 and a pool/cluster of KV SSDs ((210$a$1-210$a$n)-(210$n$1-210$n$m)). The system 200 may also include at least one of multiple homogenous cores, multiple heterogeneous cores, multiple Central Processing Units (CPUs) of different kinds and so on for performing intended functions of the host processor 202. The host processor 202 can be coupled to the host memory 204.

Examples of the host memory 204 can be at least one of a flash memory, a Read Only Memory (ROM), a Random Access Memory (RAM), a Static Random Access Memory (SRAM) and so on. In an example embodiment herein, the host memory 204 can be used for storing data associated with the host processor 202. In an example embodiment herein, the host memory 204 can be used for storing data associated with the cluster of KV SSDs. Further, the host processor 202 may be connected to at least one of a user interface unit, input/output interface ports or other components of the system 200 by connecting to a suitable bus.

The host processor 202 includes a plurality of application modules 208a-208n. The plurality of application modules 208a-208n can include host applications/software/program instructions to operate the host processor 202.

Example embodiments herein create a plurality of Redundant Array of Independent Disks (RAID) groups 210a-210n by grouping the cluster of KV SSDs/KV SSD disks. Example embodiments herein may use the terms such as "KV SSDs", KV SSD disks" and so on to refer to flash memory disks incorporating Key-Value store logic. Each RAID group (210a-210n) can include a plurality of KV SSDs ((210a1-210an)-(210n1-210nn)). The plurality of RAID groups can be created based on criteria such as, but not limited to, cost, reliability, latency for reading/writing, power consumption, data recovery speed and so on. Further, due to the Key-Value store logic, each KV SSD of the plurality of RAID groups 210a-210n can store the data of a file/directory in form of Key-Value pairs and can respond to direct data requests from the host processor 202. In an embodiment herein, keys of each Key-Value pair may not be the same. Further, the length of the keys and size of values of each Key-Value pair may vary.

Each KV SSD includes a Key-Value Application Programming Interface (API) and a Key-Value device driver (not shown). The Key-Value API operates with the Key-Value device driver, wherein the Key-Value device driver does not require traditional block mapping to store/return the data requests received from the host processor 202. In an example embodiment, each KV SSD of the plurality of RAID groups 210a-210n can be assigned with a tag based on a category of the data (the Key-Value pairs) stored in each KV SSD. Examples of the tag assigned to each KV SSD can be, but not limited to, a video tag, a document tag, an image tag, an audio tag and so on. In an example herein, a KV SSD 210a1 can be assigned with a video tag and a document tag, since the KV SSD 210a1 includes values related to documents and videos (the category of the data).

Further, each application module of the plurality of application modules 208a-208n of the host processor 202 can be connected to at least one RAID group (210a-210n). For example, an application module 208a can be connected to a RAID group 210a. Thus, the application module 208a can write/read data to/from a plurality of KV SSDs 210a1-210an that constitute the RAID group 210a. Also, the application module 208a can also be connected to one or more RAID groups (210a-210n) to interact with the plurality of KV SSDs of the RAID groups (210a-210n). Thus, increasing capacity on the host processor 202 by scaling KV SSDs (adding number of KV SSDs).

In an example embodiment, the host processor 202 may include a plurality of fabric stacks 212a-212n, wherein each fabric stack (212a-212n) can be associated with a respective application module (208a-208n). Further, each fabric stack (212a-212n) can connect the associated application module (208a-208n) with a fabric 214 for further connecting with the plurality of KV SSDs ((210a1-210an)-(210n1-210nn)) of the at least one RAID group (210a-210n). Examples of the fabric stack (212a-212n) can be, but is not limited to, an NVMe over Fabric (NVMF) stack or the like. Examples of the fabric 214 referred herein can be at least one of a Remote Direct Memory Access (RDMA), an Ethernet, a Fiber Channel (FC) and so on.

Similarly, the plurality of KV SSDs ((210a1-210an)-(210n1-210nm)) of each RAID group (210a-210n) can be connected to a switch 216 which further connects to the fabric 214 for connecting with at least one application module (208a-208n). Thus, each application module (208a-208n) can be connected to the plurality of KV SSDs ((210a1-210an)-(210n1-210nm)) of the at least one RAID group (210a-201n) over the fabric 214 as illustrated in FIG. 2A. In another example embodiment, each application module (208a-208n) can be directly connected to the plurality of KV SSDs ((210a1-210an)-(210n1-210nm)) of the at least one RAID group (210a-210n) as illustrated in FIG. 2B.

The at least one application module (208a-208n) of the host processor 202 can issue memory access commands or Input/Output (I/O) commands for writing/reading the data to/from at least one KV SSD ((210a1-210an)-(210n1-210nm)) constituting the respective connected RAID group (210a-210n). The I/O commands may include at least one of a write command and a read command. Further, the write command may include Key-Value pair(s) of the data that needs to be written to the at least one KV SSD ((210a1-210an)-(210n1-210nm)). The read command may include key(s) for which values of the data need to be read from the at least one KV SSD ((210a1-210an)-(210n1-210nm)).

In an example embodiment, for writing the data to the at least one KV SSD, the at least one application module (208a-208n) transmits the Key-Value pair(s) (associated with the data) of the write command to the at least one KV SSD selected from the plurality of KV SSDs ((210a1-210an)-(210n1-210nm)) constituting the respective connected RAID group (210a-210n). The at least one KV SSD can be selected based on factors such as, load (a number of keys stored in each KV SSD), available space (capacity of each KV SSD), bandwidth (bandwidth available at a time of I/O) and so on. The selected at least one KV SSD can be the KV SSD with a lower number of keys, lower space utilization and the highest bandwidth availability. Thus, uneven loading of the KV SSDs and inefficient bandwidth utilization can be avoided.

In an example embodiment, for reading the data from the at least one KV SSD, the at least one application module (208a-208n) transmits the key(s) (associated with the data) of the read command to the at least one KV SSD selected from the plurality of KV SSDs ((210a1-210an)-(210n1-210nm)) constituting the respective connected RAID group (210a-210n). Further, the at least one application module (208a-208n) receives the values for the transmitted key(s) from the selected at least one KV SSD. Thus, multiple I/O commands may not be received by a same KV SSD and uneven read operation can be avoided.

FIGS. 2A and 2B show example designs of the system 200, but it is to be understood that other example embodiments are not limited thereon. In other example embodiments, the system 200 may include less or a greater number of elements. Further, the labels or names of the elements are used only for illustrative purpose and does not limit the scope of the example embodiments herein. One or more units can be combined together to perform same or substantially similar function in the system 200.

Figure 3:
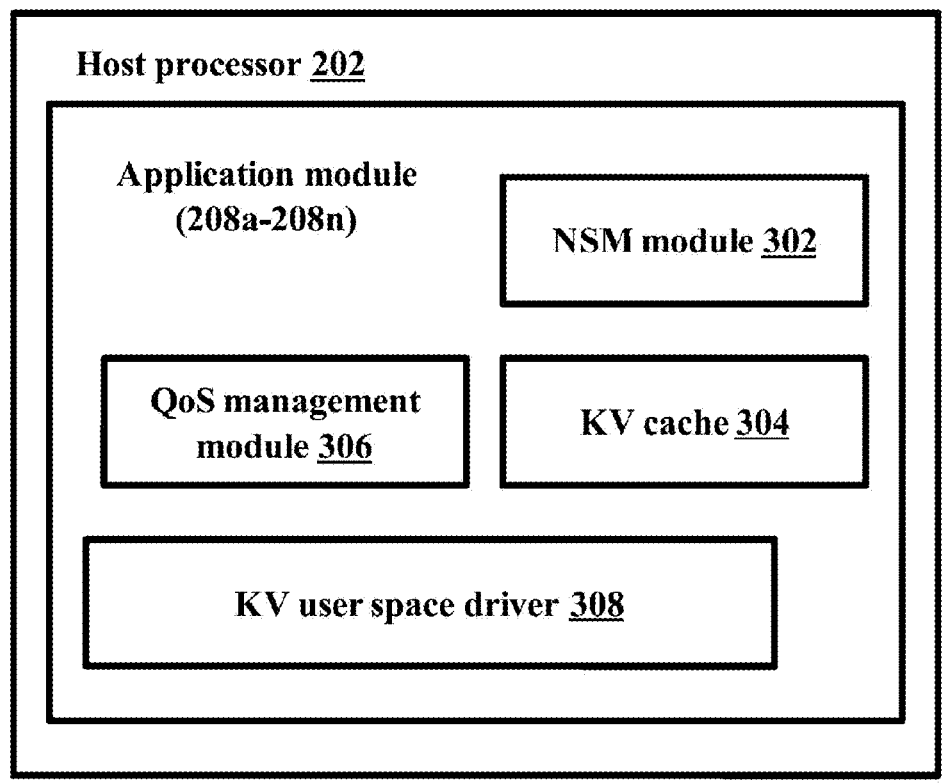
FIG. 3 is a block diagram illustrating various sub-modules of at least one application module of a host processor, according to example embodiments as disclosed herein.

FIG. 3 is a block diagram illustrating various sub-modules of the at least one application module (208a-208n) of the host processor 202, according to example embodiments as disclosed herein.

Referring to FIGS. 2A to 3, example embodiments herein are explained considering the various modules of the application module 208a connected to the RAID group 210a, but it may be obvious to a person of ordinary skill in the art that the application module 208a may be connected to at least one other RAID groups (210b-210n) and at least one other application module (208b-208n) may include similar sub-modules and corresponding functionalities.

The host processor 202 may be implemented using processing circuitry such as hardware including logic circuits, a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, or an application-specific integrated circuit (ASIC), etc.

The processing circuitry of the host processor 202 may be configured as one or more discrete special purpose processing circuitry to perform the functions of the application modules (208a-208n) and the sub-components thereof including, for example, a Name Space Mapping (NSM) module 302, a KV cache 304, a Quality of Service (QoS) management module 306, and a KV user space driver 308.

The NSM module 302 can be configured to address the plurality of KV SSDs (210a1-210an) of the RAID group 210a using the NSM module 302. The NSM module 302 can use a Namespace Mapper to provide information about identifiers associated with the plurality of KV SSDs 210a1-210an and an identifier associated with the corresponding RAID group 210a when the application module 208a wants to interact (perform a read/write operation) with the plurality of KV SSDs 210a1-210an of the connected RAID group 210a. The NSM module 302 provides the information about the identifiers by mapping a namespace (containing one or more subjects) being used by application module 208a with the connected RAID group 210a.

The KV cache 304 can be configured to store information such as, but not limited to, information about the connected RAID group 210a and associated identifier, the plurality of KV SSDs 210a-210n present in the RAID group 210a and their corresponding identifiers, application namespaces, data associated with the plurality of KV SSDs 210a-210n (load, available space on the plurality of KV SSDs 210a1-210an or the like) and so on. In an example embodiment herein, the host memory 208a can be used as the KV cache 304.

The KV user space driver 308 can be implemented as a library where the applications of the application module 208a can be linked together. In an example embodiment, the KV user space driver 308 can be, but is not limited to, an NVMe device driver or the like. The KV user space driver 308 can be configured for sending a KV command as a vendor specific command using NVMe commands. Further, the KV user space driver 308 can enable the application module 208a of the host processor 202 to directly connect with the plurality of KV SSDs (210a-210n) of the connected at least one RAID group (210a). The plurality of KV SSDs (210a-210n) can adhere to all NVMe specific admin commands. Further, the KV user space driver 308 uses the vendor specific command to get information about the plurality of KV SSDs (210a-210n) during an initialization time.

The QoS management module 306 can be configured to write/read the data to/from at least one KV SSD of the plurality of KV SSDs 210a1-210n by efficiently managing the plurality of KV SSDs 210a1-210an. On issuing the write command by the application module 208a for writing the Key-Value pair(s) of the data to the at least one KV SSD, the QoS management module 306 fetches information stored in the at least one of the KV cache 304 and the memory 204. The fetched information can be at least one of information about the clusters of KV SSDs, information about the plurality of KV SSDs 210a1-210an of the connected RAID group 210a (load information, available space information, bandwidth at a time and so on), a plurality of slab tables maintained for the plurality of KV SSDs 210a1-210an (which can be stored in the KV cache) and so on. The plurality of slab tables can include slab information of the key(s) stored in the corresponding plurality of KV SSDs 210a1-210an. The slab information can include information such as, but not limited to, information about a plurality of slabs (slab-0-slab-n), key(s) belonging to each slab (a key count), a total size of each slab, total key(s) stored in the plurality of slabs (a total key count), a total size of the key(s) belonging to the plurality of slabs. The plurality of slabs (slab-0-slab-n) can be at least one of a small slab, a medium slab, a large slab and so on. Based on the fetched information, the QoS management module 306 selects the at least one KV SSD from the plurality of KV SSDs 210a1-210an for writing the Key-Value pair(s) of the data. The QoS management module 306 sends the Key-Value pairs of the write command to the KV user space driver 308 which further forwards the Key-Value pair(s) to the selected at least one KV SSD for storing the data.

Similarly, during the read operation, the QoS management module 306 broadcasts the key(s) of the read command to the at least one KV SSD selected from the plurality of KV SSDs 210a1-210an through the KV user space driver 308 for receiving the values of the data. The at least one KV SSD can be selected using at least one of a consistent hashing function and the slab information. Thus, performing the write operation and the read operation by selecting the at least one KV SSD results in an enhanced QoS.

FIG. 3 show an example of elements included in the application module (208a-208n), but it is to be understood that other example embodiments are not limited thereon. In other example embodiments, the application module (208a-208n) may include less or a greater number of units. Further, the labels or names of the units are used only for illustrative purpose and does not limit the scope of the example embodiments herein. One or more units can be combined together to perform same or substantially similar function in the application module (208a-208n).

Figure 4:
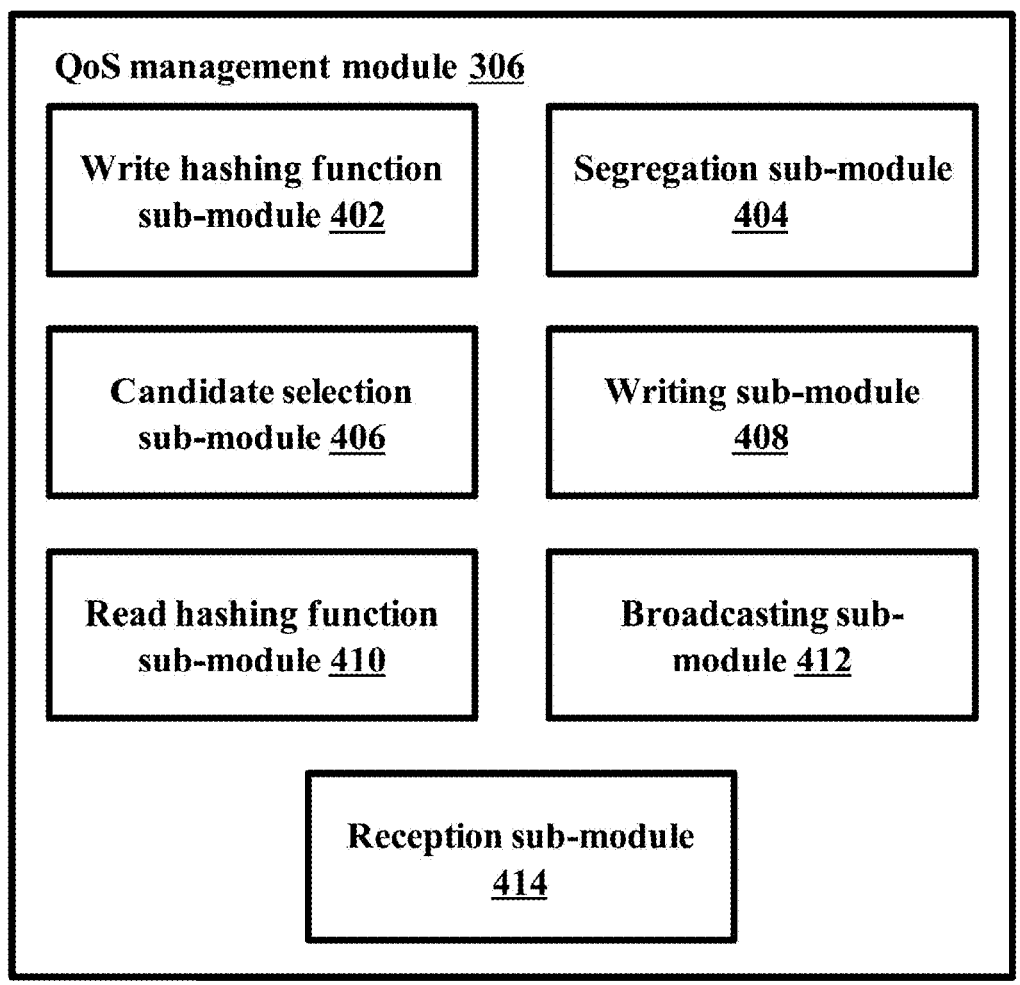
FIG. 4 is a block diagram illustrating various sub-modules of a Quality of Service (QoS) management module, according to example embodiments as disclosed herein.

FIG. 4 is a block diagram illustrating various sub-modules of the QoS module 306, according to example embodiments as disclosed herein.

Referring to FIGS. 2A-4, example embodiments herein are explained considering the QoS management module 306 of the application module 208a connected to the RAID group 210a, but it may be obvious to a person of ordinary skill in the art that a QoS management module of the at least one other application module (208b-208n) may include similar sub-modules and corresponding functionalities.

As discussed above, the host processor 202 may be implemented using processing circuitry. The processing circuitry of the host processor 202 may be configured as one or more discrete special purpose processing circuitry to perform the functions of the application modules (208a-208n) and the sub-components thereof including the Quality of Service (QoS) management module 306. As such, the processing circuitry of the host processor 202 may be configured to perform the functions of a write hashing function sub-module 402, a segregation sub-module 404, a candidate selection sub-module 406, a writing sub-module 408, a read hashing function sub-module 410, a broadcasting sub-module 412 and a reception sub-module 414, which are included in the QoS management module 306.

The write hashing function sub-module 402, the segregation sub-module 404, the candidate selection sub-module 406 and the writing sub-module 408 can be operated to perform the write operation on the write command issued by the application module 208*a* to write the data to the at least one KV SSD. The issued write command can include the Key-Value pair(s) of the data.

The write hashing function sub-module 402 can be configured to determine a configurable number of KV SSDs/a list of KV SSDs from the plurality of KV SSDs 210*a*1-210*an* for the Key(s) of the Key-Value pair(s) of the write command. The write hashing function sub-module 402 determines the configurable number of KV SSDs using the consistent hashing function. The write hashing function sub-module 402 passes the key(s) of the Key-Value pair(s) to the consistent hashing function. The consistent hashing function determines a value of a partition key/hash values using a hash function. The hash function maps the received key(s) (of variable size) with items of a hash table (stored in the at least one of the host memory 204 and the KV cache 304) to determine the hash values using at least one of a remainder method, a folding method and so on. The hash values can be integer values that indicate a range of numbers for the key(s) of the Key-Value pair(s). Based on the hash values, the consistent hashing function returns a configurable number of KV SSDs for the key(s) which can store the Key-Value pair(s) of the determined range of numbers. The configurable number of KV SSDs returned from the consistent hashing function can always be same for the key(s) and can be uniform across the plurality of KV SSDs for the given key(s).

The segregation module 404 can be configured to perform slab classification on the key(s) of the Key-Value pair(s) of the write command to derive the slab information. The segregation module 404 classifies/categorizes the key(s) of the Key-Value pair(s) into at least one slab based on a size of the associated value(s). The segregation module 404 can obtain the size of the values from the Key-Value pair(s). The at least one slab can be identified from a plurality of slabs (slab-0 to slab-n). The plurality of slabs can belong to at least one category such as, a small slab, a medium slab, a large slab and so on. Further, the at least one slab type of the key(s) of the Key-Value pair(s) indicates whether the key(s) of the Key-Value pair(s) belongs to at least one of the small slab, the medium slab and the large slab. In an example herein, if the size of value is less than 2 MB, then the segregation module 404 categorizes the key into the small slab. If the size of the value varies between 2 MB to 200 MB, then the segregation module 404 categorizes the key into the medium slab. If the size of the value is greater than 200 MB, then the segregation module 404 categorizes the key into the large slab. Thus, the slab information of the key(s) of the Key-Value pair(s) can be determined by performing the slab classification.

The candidate selection module 406 can be configured to select at least one KV SSD from the configurable number of KV SSDs for writing the Key-Value pair(s). The candidate selection module 406 fetches information about each configurable number of KV SSD from the at least one of the memory 204 and the KV cache 304. The fetched information can be at least one of load of each configurable number of KV SSD (number of keys already inserted in queue of each KV SSD), space available on each configurable number of KV SSD for storing the Key-Value pair (space utilization), bandwidth at a particular time and so on. Further, the candidate selection sub-module 406 analyzes the fetched information with respect to the slab information of the key(s) to select the at least one KV SSD from the configurable number of KV SSDs having lower space utilization, highest bandwidth availability and a lower number of keys. The selected at least one KV SSD can be at least one candidate for storing the Key-Value pair(s) of the data.

The writing sub-module 408 can be configured to write the Key-Value pair(s) to the selected at least one KV SSD. In an example embodiment, after selecting the at least one KV SSD for storing the Key-Value pair(s), the writing sub-module 408 splits the value(s) of the Key-Value pair(s) into a plurality of values of chunk sizes. In an example embodiment herein, the chunk sizes can be defined based on the slab information associated with the key. In an example herein, the chunk size of the value for the key categorized into the large slab can be equal to 2 MB. In another example embodiment, the writing sub-module 408 splits the value(s) of the Key-Value pair(s) into a plurality of values of equal sizes. Consider an example scenario, wherein the size of the value of the Key-Value pair(s) is 11 MB and $6^{th}$ KV SSDs can be selected as the candidate KV SSDs. Then, the writing sub-module 408 splits the value in same size that is of 2 MB (11 MB % 2 MB) for 5 KV SSDs and stores 1 MB in the 6th KV SSD. Further, the writing sub-module 408 writes the plurality of values of equal sizes in the selected at least one KV SSD. Further, the writing sub-module 408 writes the plurality of values of equal sizes by calling an insert function based on a current I/O classification over the selected at least one KV SSD. Thus, a plurality of KV SSDs can be effectively utilized for storing the Key-Value pair(s), which further increases the speed of the write operation.

In another example embodiment, after selecting the at least one KV SSD for writing the Key-Value pair(s), the writing sub-module 408 checks if there is any update on the key(s) of the Key-Value pair(s) by checking the slab information. The update herein refers to a change in a size/length of the key(s) of the Key-Value pair(s), value of the key(s) of the Key-Value pair(s), and so on. For checking the updates, the writing sub-module 408 checks whether the key(s) of the Key-Value pair(s) exists in at least one slab table maintained for the selected at least one KV SSD. On determining that the key(s) of the Key-Value pair(s) exists in the at least one slab table, the writing sub-module 408 checks whether there is any update for the key(s) of the Key-Value pair(s) based on the previous slab classification. On determining a change in the slab information for the key(s) of the Key-Value pair(s), the writing sub-module 408 detects the update for the key(s) of the Key-Value pair(s). On determining that there is no update available for the key(s) of the Key-Value pair, the writing sub-module 408 writes the Key-Value pair(s) to the selected at least one KV SSD and updates the at least one slab table corresponding to the at least one KV SSD.

On determining that there is an update, the writing sub-module 408 removes the key(s) of the Key-Value pair(s) from the at least one slab table maintained for the selected at least one KV SSD using a delete function ("delete( )"). Further, the writing sub-module 408 broadcasts the key(s) of the Key-Value pair(s) using an 'is_exist' function ("is_exists( )") to the selected at least one KV SSD. On determining that the key(s) of the Key-Value pair(s) does not reside in the selected at least one KV SSD, the writing sub-module 408 acknowledges an update failure response since the key(s) of the Key-Value pair(s) has not been previously written to the selected at least one KV SSD. Further, the writing sub-module 408 writes the Key-Value pair(s) to the selected at least one KV SSD by splitting the size of the value(s). Further, the writing sub-module 408 enters the slab information of the key(s) of the stored Key-Value pair(s) in the at least one slab table of the selected at least one KV SSD.

On determining that the key(s) of the Key-Value pair(s) resides in the selected at least one KV SSD, the writing sub-module 408 issues a delete function for the key(s) to the selected at least one KV SSD for removing the already existing key(s) and corresponding slab information. After removing the already existing key(s) from the selected KV SSD, the writing sub-module 408 writes the Key-Value pair(s) to the selected at least one KV SSD by splitting the size of value(s). The writing sub-module 408 also updates the slab information for the key(s) accordingly in the slab table maintained for the at least one KV SSD to which the Key-Value pair(s) has written.

Consider an example scenario, wherein the application module 208a can be connected to the RAID group 210a comprising of 20 KV SSDs. When the application module 208a issues the write command for writing the data to the at least one KV SSD, the QoS management module 306 efficiently writes the data in the form of the Key-Value pair to the KV SSDs selected based on at least one of the load, available space, bandwidth, the slab information and so on. The write hashing function sub-module 402 (of the QoS management module 306) determines the configurable number of KV SSDs from the 20 KV SSDs for storing the Key-Value pair using the consistent hashing function. The consistent hashing function applies the hash function on the key of the Key-Value pair and calculates the hash values/range of numbers for the key. In an example herein, the range of numbers calculated for the key can be 1, 3, 8, 10, 14 and further among 20 KV SSDs, a KV SSD-3, a KV SSD-5, a KV SSD-6, a KV SSD-8 and a KV SSD-9 can store the Key-Value pair falling in the range of 1-3, 1-5, 8, 10 and 14 respectively. Thus, consistent hashing function can return the KV SSD-3, the KV SSD-5, the KV SSD-6, the KV SSD-8 and the KV SSD-9 as the configurable number of KV SSDs for the key of the Key-Value pair.

After determining the configurable number of KV SSDs, the segregation sub-module 404 performs the slab classification and determines the slab information (the slab type and size) associated with the key. In an example herein, the key of the Key-Value pair may be categorized into a small slab/a slab-0. Further, the candidate selection sub-module 406 selects the KV SSD-3, the KV SSD-5 and the KV SSD-6 from the configurable number of KV SSDs as the candidates for storing the Key-Value pair. The candidates can be selected based on at least one of the space utilization, the load, the bandwidth and so on, determined among the configurable number of KV SSDs and the slab information associated with the key of the Key-Value pair. Thus, the write operation can be performed by efficiently balancing the load and efficiently utilizing the bandwidth.

The writing sub-module 408 may write the Key-Value pair to the KV SSD-3, the KV SSD-5 and the KV SSD-6 by splitting the size of the value of the Key-Value pair. In an example herein, the value of the Key-Value pair may be of 3 GB, then the writing sub-module 408 splits the 3 GB value into three 1 GB values. The writing sub-module 408 writes the three 1 GB values to the KV SSD-3, the KV SSD-5 and the KV SSD-6 in parallel, wherein each selected KV SSD can store 1 GB value. Thus, the write operation can be performed by increased speed.

The read hashing function sub-module 410, the broadcasting sub-module 412 and the reception sub-module 414 of the QoS management module 306 can be operated to perform the read operation. The read hashing function sub-module 410 can be configured to determine the configurable number of KV SSDs for the key(s) of the read command issued for reading the values of the data from the at least one KV SSD. The configurable number of KV SSDs can be determined using the consistent hashing function. The consistent hashing function applies the hash function on the key(s) of the read command and calculates the hash values for the key(s). Based on the calculated hash values, the consistent hashing function returns the configurable number of KV SSDs from the plurality of KV SSDs for the key(s) of the read command.

The broadcasting sub-module 412 can be configured to broadcast the key(s) of the read command for obtaining the values of the data for the key(s). Before broadcasting the key(s) of the read command, the broadcasting sub-module 412 checks for the availability of slab information for the key(s) of the read command in the slab tables maintained for the configurable number of KV SSDs. The slab information herein acts as pseudo metadata providing information about the at least one KV SSD storing the value(s) for the key(s) of the read command. If the slab information is available for the key(s) of the read command in the at least one slab table of the slab tables maintained for the configurable number of KV SSDs, the broadcasting sub-module 412 selects the corresponding at least one KV SSD for reading the values. The broadcasting sub-module 412 broadcasts the key(s) to the selected at least one KV SSD for obtaining the value(s) for the key(s) of the read command.

In an example embodiment, if the slab information does not present in the slab tables of the configurable number of KV SSDs for the key(s) of the read command, then the broadcasting sub-module 412 broadcasts the key(s) to the configurable number of KV SSDs for obtaining the values for the key(s) of the read command.

In another example embodiment, if the slab information is not present in the slab tables of the configurable number of KV SSDs for the key(s) of the read command, the broadcast sub-module 412 checks for the tags associated with the configurable number of KV SSDs. The tags indicate the type of value being stored in the configurable number of KV SSDs. On determining the association of the tags with the configurable number of KV SSDs, the broadcasting sub-module 412 filters the configurable number of KV SSDs based on the tags that match with a category of the key(s) of the read command. The broadcasting sub-module 412 broadcasts the key(s) of the read command to the filtered KV SSDs of the configurable number of KV SSDs to obtain the values for the key(s) of the read command.

The reception sub-module 414 can be configured to receive the values of the data from the selected at least one KV SSD or the filtered KV SSDs of the configurable number of KV SSDs for the key(s) of the read command. The reception sub-module 414 consolidates the values received from the at least one KV SSD and updates the application module 208a and the slab table maintained for the at least one KV SSD from which the values of the data has been received.

Consider an example scenario, wherein the application module 208a can be connected to the RAID group 210a comprising of 20 KV SSDs. The application module 208a can issue the read command for reading the values of the data. The read command may include a key associated with the data. For the key of the read command, the read hashing function sub-module 410 determines the configurable number of KV SSDs using the consistent hashing function. In an example herein, the consistent hashing function returns a KV SSD-3, a KV SSD-5, a KV SSD-6, a KV SSD-8 and a KV SSD-9 as the configurable number of KV SSDs for the key of the read command. After determining the configurable number of KV SSDs, the broadcasting sub-module 412 checks the slab tables maintained for the configurable number of KV SSDs for the slab information of the key of the read command. On determining that the slab information for the key of the read command is available in the slab tables maintained for the KV SSD-3, the KV SSD-5 and the KV SSD-6, the broadcasting sub-module 412 broadcasts the key of the read command to the KV SSD-3, the KV SSD-5 and the KV SSD-6. The reception sub-module 414 receives and consolidates the values from the KV SSD-3, the KV SSD-5 and the KV SSD-6 and updates the application module 208*a*.

On determining that the slab information for the key of the read command is not available in the slab tables maintained for the configurable number of KV SSDs, the broadcasting sub-module 412 broadcasts the key of the read command to the KV SSD-3, the KV SSD-5, the KV SSD-6, the KV SSD-8 and the KV SSD-9 (the configurable number of KV SSDs). In response to the broadcasted key, the reception sub-module 414 receives the values of the data from the at least one KV SSD of the configurable number of KV SSDs. In an example herein, the reception sub-module 414 receives and consolidates the values from the KV SSD-3, the KV SSD-5 and the KV SSD-6 and updates the application module 208*a*.

FIG. 4 show an example of the elements of the QoS management module 306, but it is to be understood that other example embodiments are not limited thereon. In other example embodiments, the QoS management module 306 may include less or a greater number of units. Further, the labels or names of the units are used only for illustrative purpose and does not limit the scope of the example embodiments herein. One or more elements can be combined together to perform same or substantially similar function in the QoS management module 306.

Figure 5A:
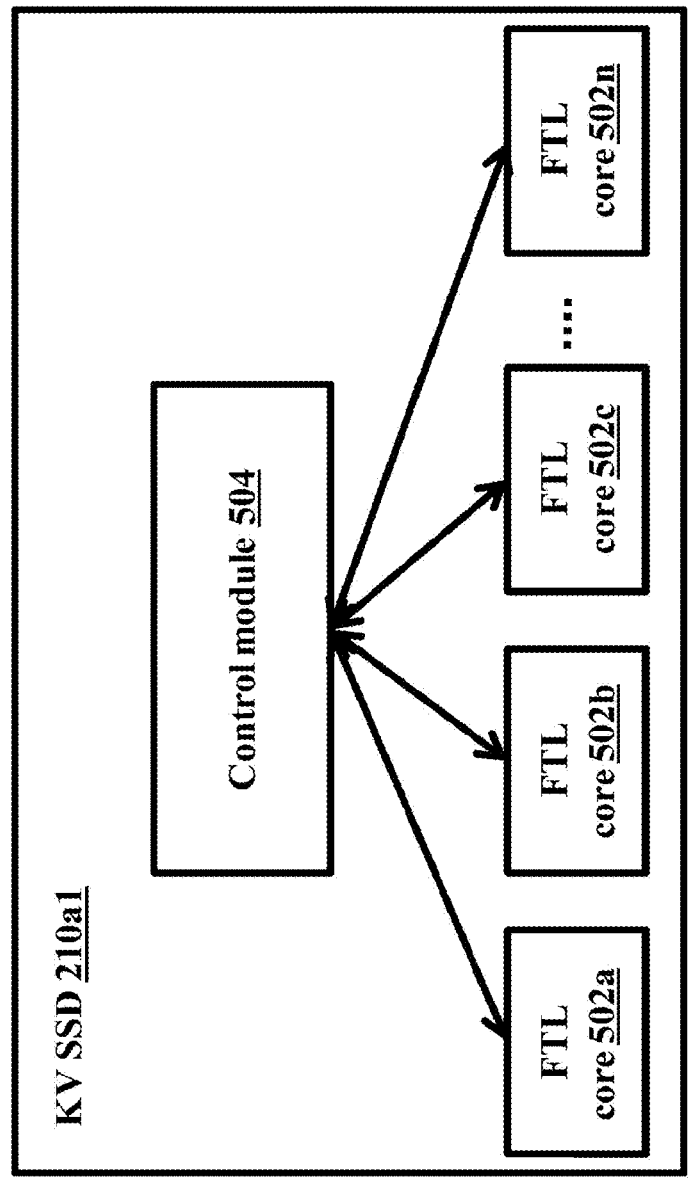
FIGS. 5A and 5B are block diagrams illustrating various modules of at least one KV SSD, according to example embodiments disclosed herein.
Figure 5B:
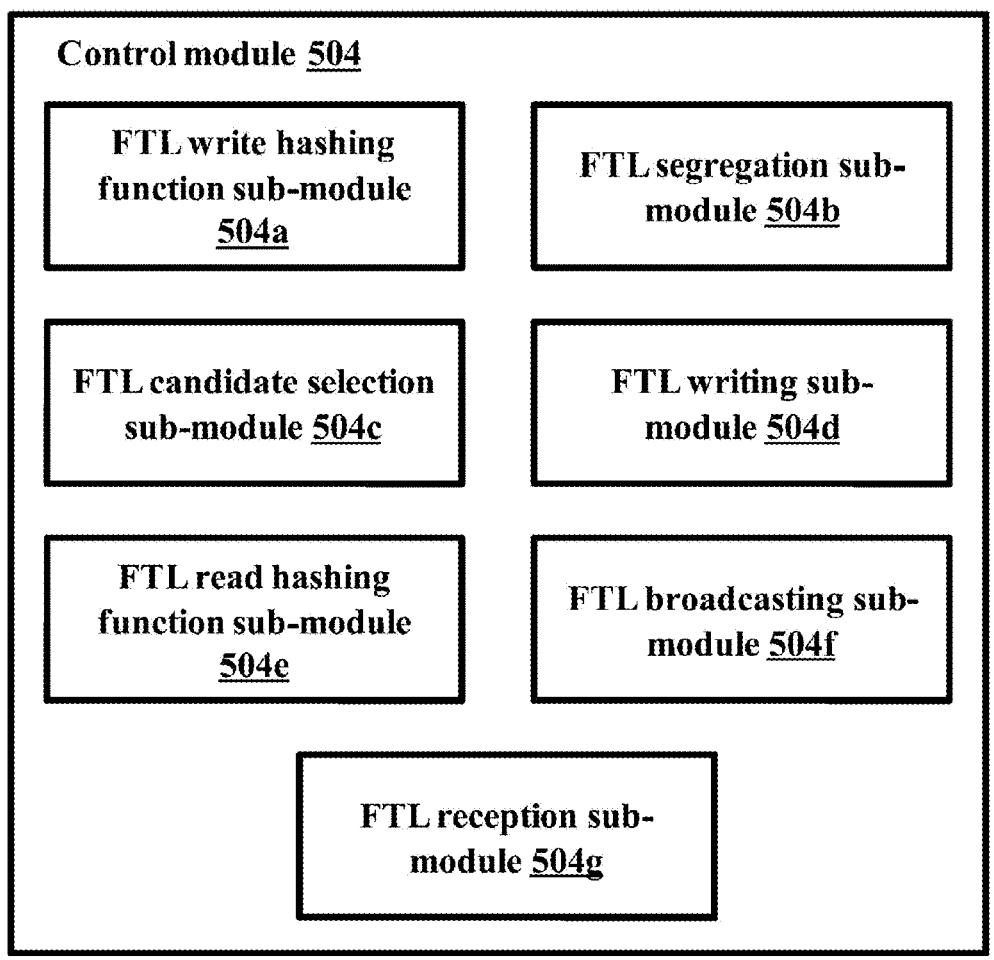

FIGS. 5A and 5B are block diagrams illustrating various modules of the KV SSD ((210*a*1-210*an*)-(210*n*1-210*nm*)), according to example embodiments disclosed herein.

Referring to FIGS. 2A, 2B, 5A and 5B, example embodiments herein are explained considering a KV SSD 210*a*1 of the RAID group 210*a*, but it may be obvious to a person of ordinary skill in the art that at least one other KV SSD of the at least one other RAID group (210*a*-210*n*) may include similar sub-modules and corresponding functionalities. The KV SSD 210*a*1 includes a plurality of Flash Translation Layer (FTL) cores 502*a*-502*n* and a control module 504.

The FTL cores 502*a*-502*n* can be configured to store the Key-Value pair(s) received from the application module 208*a* of the host processor 202 to a memory of the KV SSD 210*a*1. The memory of the KV SSD 210*a*1 comprises of a NAND flash die including planes, which further comprise blocks, which further comprise memory pages. The Key-Value pair(s) can be stored in the memory pages.

The control module 504 can be configured to efficiently manage the plurality of FTL cores on receiving the I/O commands (the write command/read command) from the application module 208*a* of the host processor 202.

The control module 504 of each of the KV SSDs ((210*a*1-210*an*)-(210*n*1-210*nm*)) may be implemented using processing circuitry such as hardware including logic circuits, a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, or an application-specific integrated circuit (ASIC), etc.

As illustrated in FIG. 5B, the processing circuitry of each of the KV SSDs ((210*a*1-210*an*)-(210*n*1-210*nm*)) may be configured as one or more discrete special purpose processing circuitry to perform the functions of the components of the control module 504 including a FTL write hashing function sub-module 504*a*, a FTL segregation sub-module 504*b*, a FTL candidate selection sub-module 504*c*, a FTL writing sub-module 504*d*, a FTL read hashing function sub-module 504*e*, a FTL broadcasting sub-module 504*f* and a FTL reception sub-module 504*g*.

The FTL write hashing function sub-module 504*a*, the FTL segregation sub-module 504*b*, the FTL candidate selection sub-module 504*c* and the FTL writing sub-module 504*d* can be operated to write the Key-Value pair(s) received from the host processor 202 to at least one FTL core.

The FTL write hashing function sub-module 504*a* can be configured to determine a configurable number of FTL cores/a list of FTL cores from the plurality of FTL cores 502*a*-502*n* for the key(s) of the Key-Value pair(s) received from the host processor 202. The FTL write hashing function sub-module 504*a* determines the configurable number of FTL cores using the consistent hashing function. The FTL write hashing function sub-module 504*a* passes the key(s) of the Key-Value pair(s) received from the host processor 202 to the consistent hashing function. The consistent hashing function determines a value of a partition key/hash values for the received keys(s) using a hash function. The hash function maps the received key(s) (of variable size) with items of a hash table (stored in the at least one of the memory of the KV SSD 210*a*1) to determine the hash values using at least one of a remainder method, a folding method and so on. The hash values can be integer values that indicate a range of numbers for the received key(s). Based on the hash values, the consistent hashing function returns a configurable number of FTL cores for the key(s), which can store the Key-Value pair. The configurable number of FTL cores returned from the consistent hashing function can always be same for the key(s) and can be uniform across the plurality of FTL cores for the given key(s).

The FTL segregation module 504*b* can be configured to perform slab classification to check slab information of the key(s) of the Key-Value pair(s) received from the host processor 202. The FTL segregation module 504*b* classifies/categorizes the received key(s) into at least one slab based on a size of the associated value(s). The slab type can be at least one of a small slab, a medium slab and a large slab. In an example herein, if the size of the value is less than 2 MB, then the FTL segregation module 504*b* segregates the key into the small slab. If the size of the value varies between 2 MB to 200 MB, then the FTL segregation module 504*b* segregates the key into the medium slab. If the size of the value is greater than 200 MB, then the FTL segregation module 504*b* segregates the key into the large size. Thus, determining the slab information for the key(s) of the Key-Value pair(s) received from the host processor 202. Further, the FTL segregation module 504*b* maintains a slab table for each FTL core of the plurality of FTL cores 502*a*-502*n* to store the slab information of the key(s). The slab table can be stored in the memory of the KV SSD 210a1. The slab table includes an array of slab entries consisting of an address field, a key count, a slab type field indicating a total size of the slab type. Thus, the slab information can act as a pseudo meta-data for the key(s) requested in a future.

The FTL candidate selection module 504c can be configured to select at least one FTL core from the configurable number of FTL cores for writing the Key-Value pair(s). The FTL candidate selection module 504c fetches information about each FTL core from the memory of the KV SSD 210a1. The fetched information can be at least one of load of each configurable number of FTL core (number of keys already inserted), space available on each configurable number of FTL core for storing the Key-Value pair (space utilization), bandwidth at a particular time and so on. Further, the FTL candidate selection module 504c analyzes the fetched information and the slab information of the key(s) of the Key-Value pair(s) and selects the at least one FTL core from the configurable number of FTL cores. The selected at least one FTL core can be at least one candidate for storing the Key-Value pair(s) of the data received from the host processor 202.

The FTL writing sub-module 504d can be configured to write the Key-Value pair(s) to the selected at least one FTL core. After selecting the at least one FTL core for storing the Key-Value pair(s), the FTL writing sub-module 504d splits the value(s) of the Key-Value pair(s) received from the host processor 202 into a plurality of values of equal sizes. Further, the FTL writing sub-module 504d stores the plurality of values of equal sizes in the selected at least one FTL core using the insert function. Thus, a plurality of FTL cores can be effectively utilized for storing the Key-Value pair(s), which further increases speed of the write operation.

Consider an example scenario, wherein the host processor 202 sends the write command of Key-Value pair(s) to the KV SSD 210a1, and the KV SSD 210a1 includes 10 FTL cores. On receiving the Key-Value pair(s) from the host processor 202, the control module 504 determines a FTL core-2, a FTL core-4, a FTL core-5 and a FTL core-6 as the configurable number of FTL cores for the key(s) of the Key-Value pair(s) received from the host processor 202. The control module 504 segregates the received key(s) into the at least one slab by deriving the slab information. The control module 504 further selects the at least one FTL core from the configurable number of FTL cores for storing the received Key-Value pair(s). The at least one FTL core can be selected based on at least one of the space utilization, the load, the bandwidth and so on determined among the configurable number of FTL cores and the slab information associated with the received key(s). In an example herein, the FTL core-2 and the FTL core-4 can be selected to store the received Key-Value pair(s). The control module 504 further splits the value(s) of the Key-Value pair(s) into the plurality of values of equal chunks of configurable sizes for storing into the FTL core-2 and the FTL core-4. As the sizes of the values can be unaligned to any specific memory size, the split results in one chunk that can be different in size from the other chunks. Thus, overloading of the FTL cores can be avoided during the storage of the Key-Value pair(s).

The FTL read hashing function sub-module 504e, the FTL broadcasting sub-module 504f and the FTL reception sub-module 504g of the control unit 504 can be operated to read the values of the data from the selected FTL cores on receiving the key(s) of the data from the host processor 202. The FTL read hashing function sub-module 504e can be configured to determine the configurable number of FTL cores for the received key(s). The configurable number of FTL cores can be determined using the consistent hashing function. The consistent hashing function applies the hashing function on the received key(s) and calculates the hash values for the received key(s). Based on the calculated hash values, the consistent hashing function returns the configurable number of FTL cores from the plurality of FTL cores 502a-502n for the key(s) received from the host processor 202.

The FTL broadcasting sub-module 504f can be configured to broadcast the received key(s) to the at least one FTL core for receiving the associated values. Before broadcasting the received key(s), the FTL broadcasting sub-module 504f checks for the slab information associated with the received key(s) in the slab tables maintained for the configurable number of FTL cores. Based on the availability of the slab information for the received key(s) in the at least one slab table, the FTL broadcasting sub-module 504f selects the associated at least one FTL core for reading the values for the received key(s). The slab information may act as pseudo metadata providing information about the at least one FTL core storing the values for the received key(s). The FTL broadcasting sub-module 504f broadcasts the received key(s) to the selected at least one FTL core for obtaining the values for the key(s) received from the host processor 202.

If the slab information does not present in the slab tables for the key(s) of the read command, the FTL broadcasting sub-module 504f broadcasts the key(s) to the configurable number of FTL cores for obtaining the value(s) for the key(s).

The FTL reception sub-module 504f can be configured to receive the values of the data from the at least one FTL core of the configurable number of FTL cores for the key(s) received from the host processor 202. The FTL reception sub-module 504f consolidates the value(s) for transmitting to the host processor 202.

Consider an example scenario, wherein the host processor 202 sends the read command including the key to the KV SSD 210a1 for reading the values of the data and the KV SSD 210a1 includes 10 FTL cores. On receiving the key(s) from the host processor 202, the control module 504 determines a FTL core-2, a FTL core-4, a FTL core-5 and a FTL core-6 as configurable number of FTL cores for the key(s) of the Key-Value pair(s) received from the host processor 202. The control module 504 further broadcasts the received key(s) to the determined FTL cores using the 'is_exist' function. In response to the broadcasted key(s), the control module 504 receives the values from the at least one FTL core of the determined FTL cores. In an example herein, the control module 504 receives the values from the FTL core-2 and the FTL core-4 and consolidates the values for sending to the host processor 202.

FIGS. 5A and 5B show an example of the elements of the KV SSD 210a1, but it is to be understood that other example embodiments are not limited thereon. In other example embodiments, the KV SSD 210a1 may include less or a greater number of units. Further, the labels or names of the elements are used only for illustrative purpose and does not limit the scope of the example embodiments herein. One or more elements can be combined together to perform same or substantially similar function in the KV SSD 210a1.

Figure 6A:
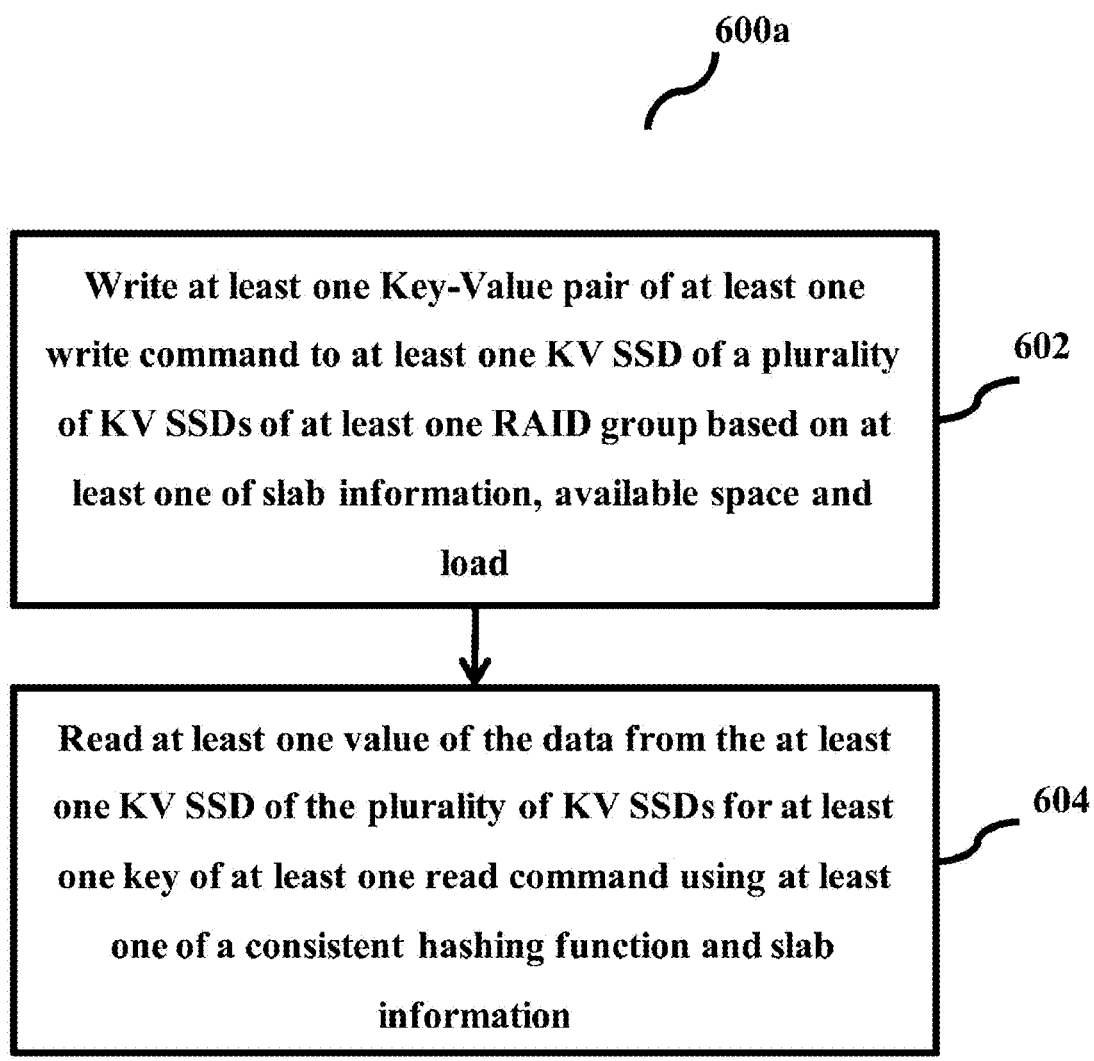
FIG. 6A is a flow diagram illustrating a method for efficiently managing the plurality of KV SSDs, according to example embodiments as disclosed herein.

FIG. 6A is a flow diagram 600a illustrating a method for efficiently managing a plurality of KV SSDs, according to example embodiments as disclosed herein.

Referring to FIG. 6A, in operation 602, the method includes writing, by the host processor 202, the Key-Value pair(s) of the write command to the at least one KV SSD of the plurality of KV SSDs 210a1-210an of the at least one RAID group 210a based on at least one of slab information and available space and load of the at least one KV SSD. The Key-Value pair(s) is associated with the data required to be written to the at least one KV SSD. The host processor 202 uses the consistent hashing function for determining the configurable number of KV SSDs from the plurality of KV SSDs 210a1-210an for the key of the Key-value pair(s). The host processor 202 derives the slab information for the key of the Key-Value pair by performing the slab information. Thereafter, the host processor 202 selects the at least one KV SSD from the configurable number of KV SSDs based on at least one of the slab information derived for the at least one key of the Key-Value pair, load of each KV SSD of the configurable number of KV SSDs and space available on each KV SSD of the configurable number of KV SSDs. The host processor 202 then writes the Key-Value pair(s) to the selected at least one KV SSD by dividing the value into the plurality of values of the chunk size. In an example embodiment, the chunk size can be based on the slab information associated with the key. In another example embodiment, the chunk size can be the equal size of the value.

In operation 604, the method includes reading, by the host processor 202, the value of the data from the at least one KV SSD of the plurality of KV SSDs 210a1-210an for the key of the read command using at least one of the consistent hashing function and the slab information. The host processor 202 uses the consistent hashing function to determine the configurable number of KV SSDs from the plurality of KV SSDs 210a1-210an for the key of the read command. The host processor 202 checks for the availability of slab information for the key(s) of the read command in the slab tables maintained for the configurable number of KV SSDs. If the slab information is available for the key(s) of the read command in the at least one slab table of the slab tables maintained for the configurable number of KV SSDs, the host processor 202 selects the corresponding at least one KV SSD for reading the values. The host processor 202 broadcasts the key(s) to the selected at least one KV SSD for obtaining the value(s) for the key(s) of the read command. If the slab information is not present in the slab tables of the configurable number of KV SSDs for the key(s) of the read command, then the host processor 202 broadcasts the key(s) to the configurable number of KV SSDs using the is_exist function for obtaining the values for the key(s) of the read command. The host processor 202 reads the value from the at least one KV SSD of the configurable number of KV SSDs including the value of the data for the key of the read command.

The various actions, acts, blocks, steps, or the like in the method and the flow diagram 600a may be performed in the order presented, in a different order or simultaneously. Further, in some example embodiments, some of the actions, acts, blocks, steps, or the like may be omitted, added, modified, skipped, or the like without departing from the scope of the example embodiments.

Figure 6B:
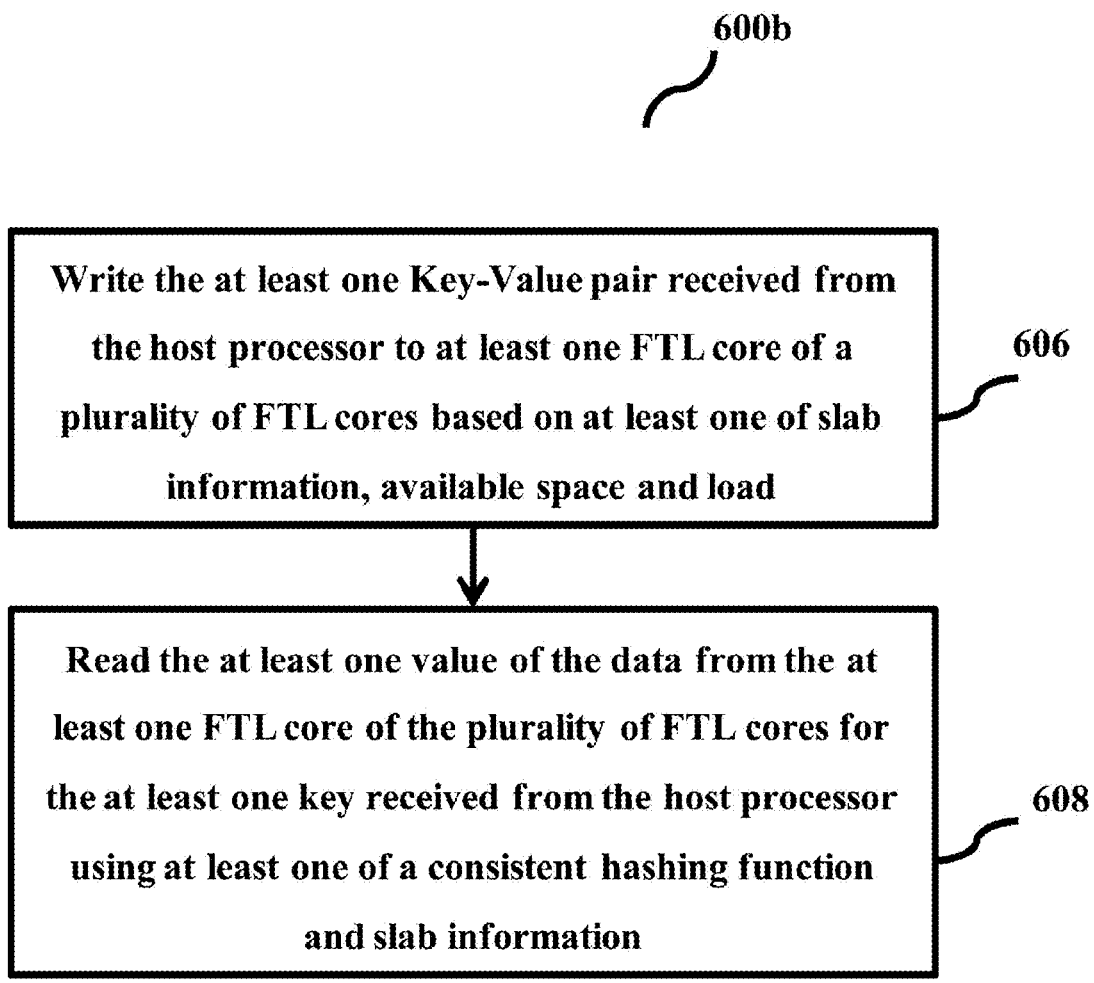
FIG. 6B is a flow diagram illustrating a method for managing the plurality of Flash Translation Layer (FTL) cores of at least one KV SSD, according to example embodiments as disclosed herein.

FIG. 6B is a flow diagram 600b illustrating a method for managing the plurality of Flash Translation Layer (FTL) cores of the KV SSD, according to example embodiments as disclosed herein.

Referring to FIG. 6B, in operation 606, the method includes writing, by the control module 504 of the selected at least one KV SSD, the Key-Value pair(s) received from the host processor 202 to the at least one FTL core of the plurality of FTL cores 502a-502n based on at least one of slab information, available space and load. The control module 504 uses the consistent hashing function for determining the configurable number of FTL cores from the plurality of FTL cores 502a-502n for the key of the at least one Key-Value pair received from the host processor 202. The control module 504 derives the slab information for the key of the received Key-Value pair by performing the slab classification. Thereafter, the control module 504 selects the at least one FTL core from the configurable number of FTL cores based on at least one of the slab information derived for the key of the received Key-Value pair, load of each FTL core of the configurable number of FTL cores and space available on each FTL core of the configurable number of FTL cores. The control module 504 then writes the received Key-Value pair to the selected at least one FTL core by dividing the value into the plurality of values of the chunk size. In an embodiment, the chunk size can be defined based on the slab information associated with the key. In another embodiment, the chunk size can be the equal size of the value.

In operation 608, the method includes, reading, by the control module 504, the value of the data from the at least one FTL core of the plurality of FTL cores 502a-502n for the at least one key received from the host processor 202 using at least one of the consistent hashing function and the slab information. The control module 504 uses the consistent hashing function for determining the configurable number of FTL cores from the plurality of FTL cores 502a-502n for the key received from the host processor 202. The control module 504 checks for the slab information associated with the received key(s) in the slab tables maintained for the configurable number of FTL cores. Based on the availability of the slab information for the received key(s) in the at least one slab table, the control module 504 selects the associated at least one FTL core for reading the values for the received key(s). The control module 504 broadcasts the received key(s) to the selected at least one FTL core for obtaining the values for the key(s) received from the host processor 202. If the slab information does not present in the slab tables for the key(s) of the read command, the control module 504 broadcasts the key(s) to the configurable number of FTL cores using the is_exist function for obtaining the value(s) for the key(s). The control module 504 then reads the at least one value from the at least one FTL core of the configurable number of FTL cores including the value of the data for the key received from the host processor 202. The control module 504 consolidates the value of the data for transmitting to the host processor 202.

The various actions, acts, blocks, steps, or the like in the method and the flow diagram 600b may be performed in the order presented, in a different order or simultaneously. Further, in some example embodiments, some of the actions, acts, blocks, steps, or the like may be omitted, added, modified, skipped, or the like without departing from the scope of the example embodiments.

Figure 7:
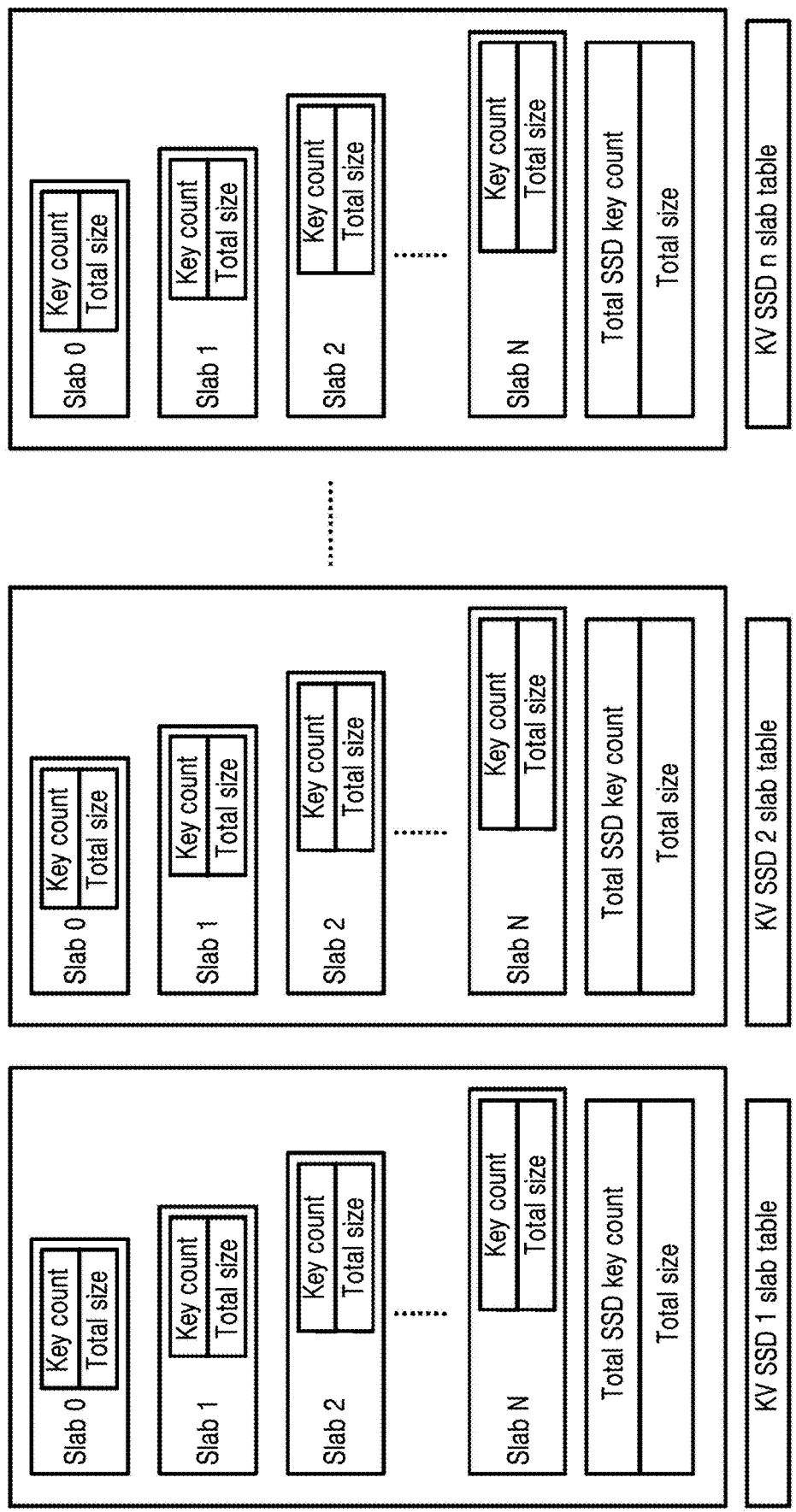
FIG. 7 is an example diagram illustrating slab tables maintained for a plurality of KV SSDs on a host processor, according to example embodiments as disclosed herein.

FIG. 7 is an example diagram illustrating the slab tables maintained for the plurality of KV SSDs 210a1-210an on the host processor 202, according to example embodiments as disclosed herein.

Referring to FIG. 7, the plurality of slab tables includes the slab information for the keys of the Key-Value pairs stored in the plurality of KV SSDs 210a1-210an. The slab information stored for the key can be at least one of slab types (slab-0-slab-n), key count and total size of keys belonging each slab, total key count and total key size of all the slab types and so on.

Figure 8:
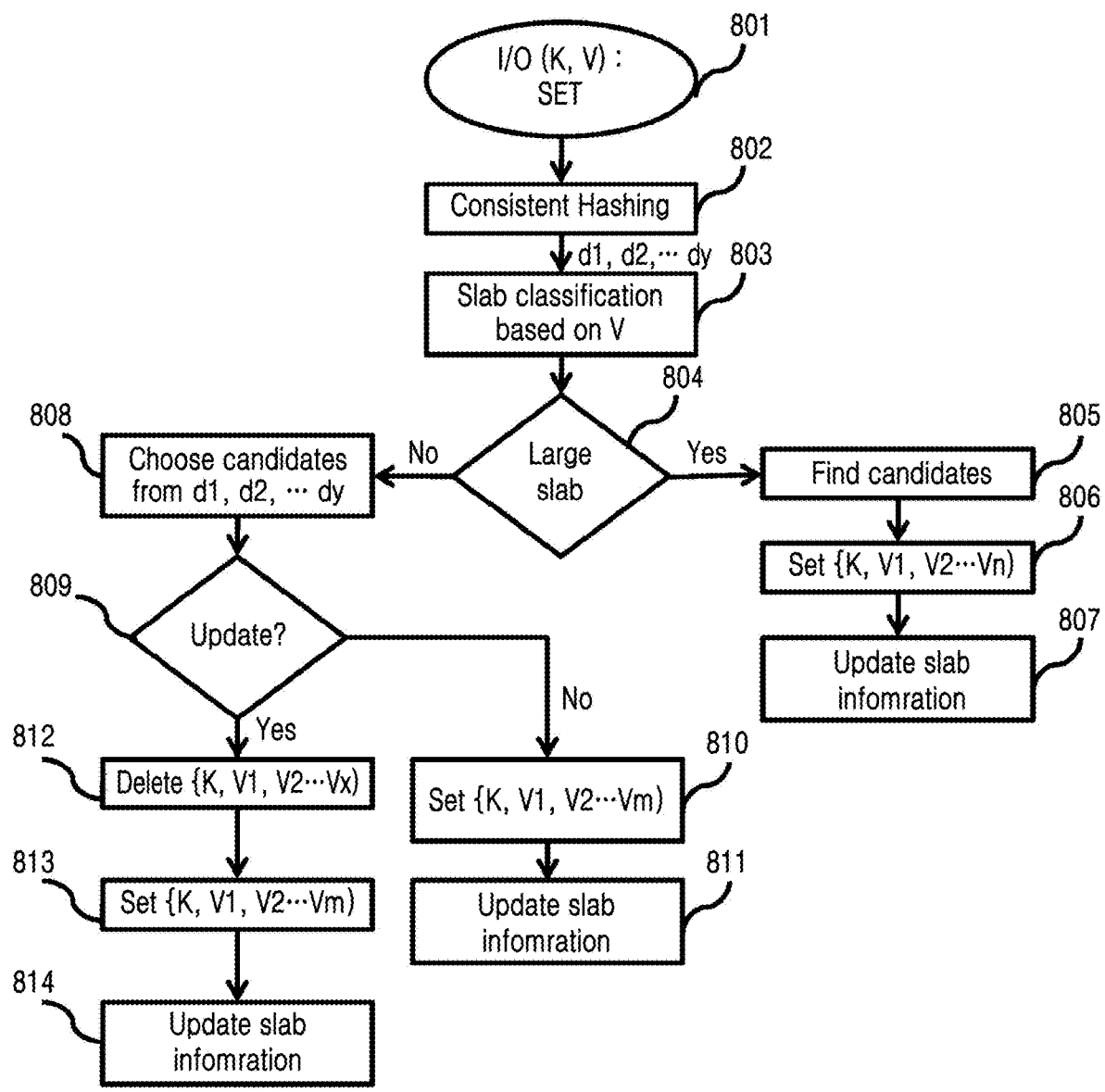
FIG. 8 is an example flow diagram illustrating a method for performing a write operation to store Key-Value pairs in selected at least one KV SSD, according to example embodiments as disclosed herein.

FIG. 8 is an example flow diagram illustrating a method for performing the write operation to store the Key-Value pairs in the selected at least one KV SSD, according to embodiments as disclosed herein.

Referring to FIG. 8, in operation 801, the host processor 202 issues the write command including the Key-Value pair for writing the data to the selected at least one KV SSD of the connected plurality of KV SSDs 210a1-210an.

In operation 802, the host processor 202 uses the consistent hashing function to determine the configurable number of KV SSDs (d1, d2, . . . dy) from the plurality of KV SSDs 210a1-210an for storing the Key-Value pair.

In operation 803, the host processor 202 performs the slab classification to classify the key of the issued Key-Value pair into the at least one slab type.

In operation 804, the host processor 202 checks whether the key of the issued Key-Value pair belongs to the large slab.

On determining that the key of the issued Key-Value pair belongs to the large slab, in operation 805, the host processor 202 selects the at least one KV SSD from the configurable number of KV SSDs for storing the Key-Value pair. The at least one KV SSD can be selected based on criteria such as, but not limited to, load and available space of the configurable number of KV SSDs, the slab type of the classified key and so on. In operation 806, the host processor 202 writes the Key-Value pair to the selected at least one KV SSD. In operation 807, the host processor 202 updates the slab information for the key of the stored Key-Value pair in the slab tables maintained for the at least one KV SSD in which the Key-Value pair is stored.

On determining that the key of the Key-Value pair does not belong to the large slab, in operation 808, the host processor 202 selects the at least one KV SSD from the configurable number of KV SSDs for storing the Key-Value pair. The at least one KV SSD can be selected based on criteria such as, but not limited to, load and available space of the configurable number of KV SSDs, the slab type of the classified key and so on.

In operation 809, the host processor 202 checks if there are any updates available for the key of the Key-Value pair. The updates can be checked by checking the slab information associated with the key of the Key-Value pair based on the previous slab classification.

On determining that the updates are not available, in operation 810, the host processor 202 writes the issued Key-Value pair to the selected at least one KV SSD. In operation 811, the host processor 202 updates the slab information for the key of the stored Key-Value pair in the slab tables maintained for the at least one KV SSD in which the Key-Value pair is stored.

On determining that the updates are available, in operation 812, the host processor 202 issues the delete instruction to the selected at least one KV SSD for deleting the keys which has previously written to the selected at least one KV SSD. Further, the host processor 202 removes the slab information for the deleted/removed key from the slab tables maintained for the selected at least one KV SSD. In operation 813, the host processor 202 writes the issued Key-Value pair to the selected at least one KV SSD. In operation 814, the host processor 202 updates the slab information for the key of the stored Key-Value pair in the at least one slab table maintained for the at least one KV SSD in which the Key-Value pair is stored. Thus, writing the Key-Value pair to the at least one selected KV SSD avoids the overloading of the KV SSDs.

Figure 9:
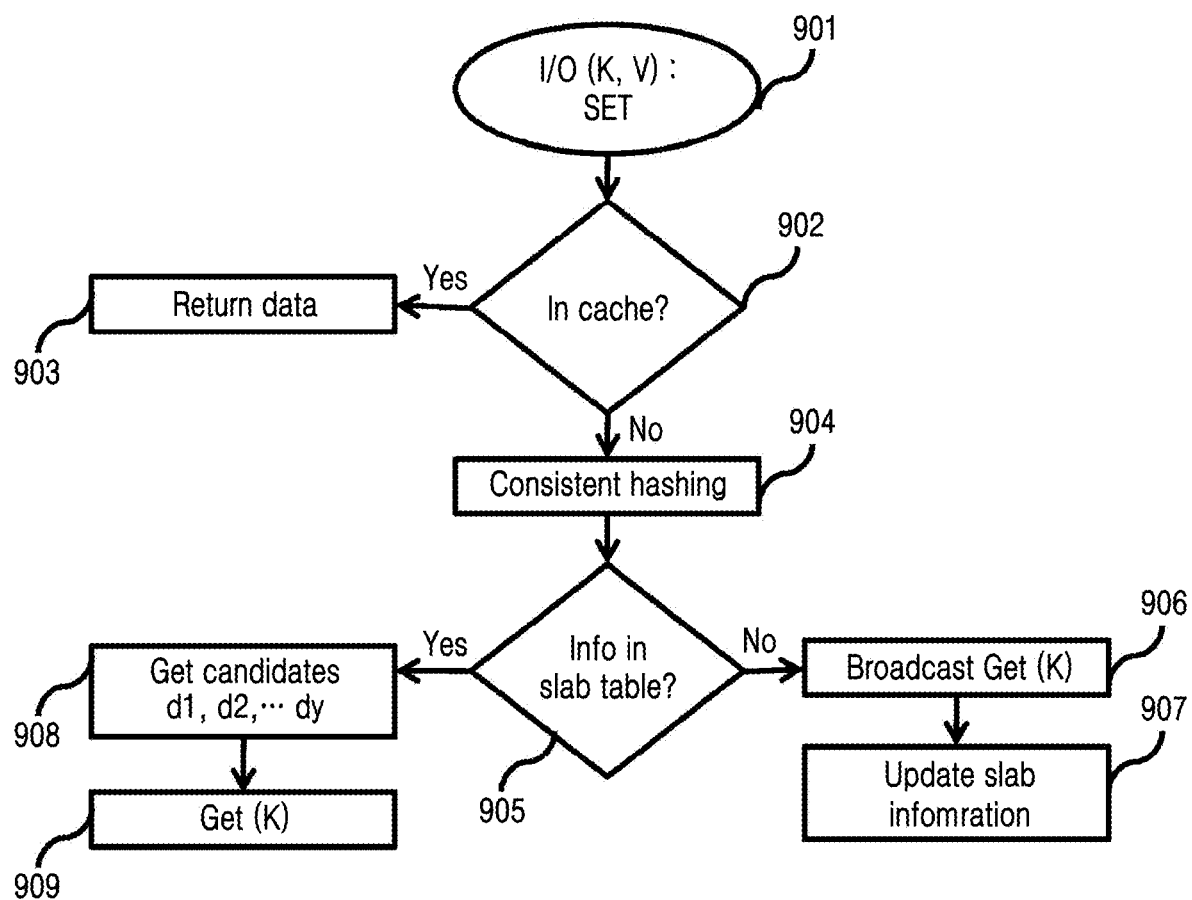
FIG. 9 is an example flow diagram illustrating a method for performing a read operation to read value from selected at least one KV SSD, according to example embodiments as disclosed herein.

FIG. 9 is an example flow diagram illustrating a method for performing the read operation to read the values from the selected KV SSDs, according to example embodiments as disclosed herein.

Referring to FIG. 9, in operation 901, the host processor 202 issues the read command to fetch the values for the key.

In operation 902, the host processor 202 checks in the KV cache for the values associated with the issued key.

On determining that the values are available in the KV cache for the issued key, in operation 903, the host processor 202 fetches the values from the KV cache.

On determining that the values are not available in the KV cache, in operation 904, the host processor 202 uses the consistent hashing function to determine the configurable number of KV SSDs for the issued key.

In operation 905, the host processor checks for the availability of the slab information for the issued key in the slab tables maintained for the configurable number of KV SSDs.

On determining that the slab information for the issued key is not available in the slab tables maintained for the configurable number of KV SSDs, in operation 906, the host processor 202 broadcasts the key to the configurable number of KV SSDs. The host processor 202 receives the values from the at least one KV SSD of the configurable number of KV SSDs for the issued key. In operation 907, the host processor 202 updates the slab information for the issued key in the slab tables maintained for the at least one KV SSD from which the values are received for the issued key.

On determining that the slab information for the issued key is available in the at least one slab table maintained for the at least one KV SSD, in operation 908, the host processor 202 selects the at least one KV SSD from the configurable number of KV SSDs. The host processor 202 selects the at least one KV SSD as the at least one candidate for obtaining the values for the issued key. In operation 909, the host processor 202 broadcasts the issued key to the selected at least one KV SSD for receiving the values for the issued key. Thus, faster search/read operation can be performed by broadcasting the key to the selected at least one KV SSD.

Figure 10:
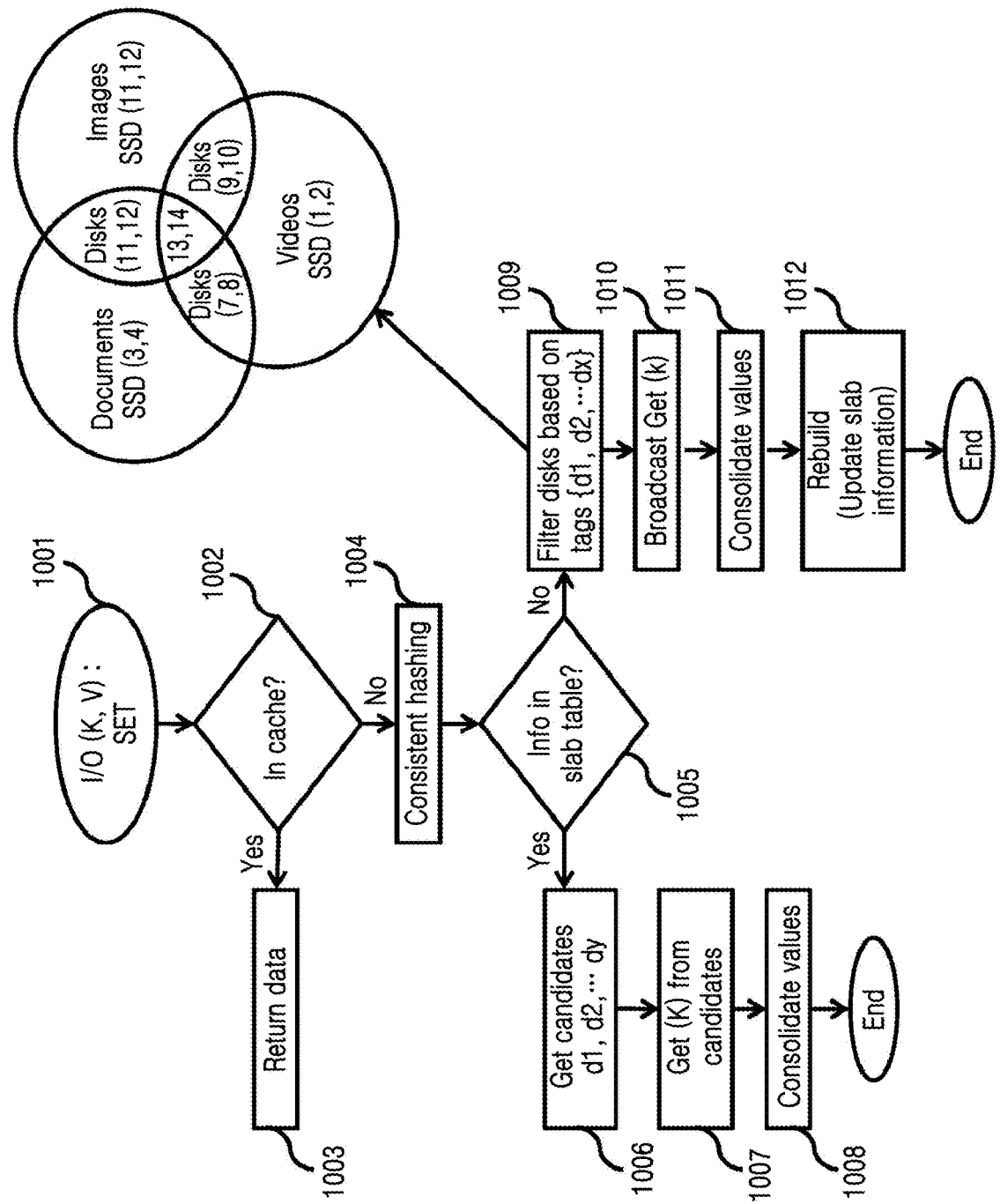
FIG. 10 is an example flow diagram illustrating a method for performing a read operation to read values from selected at least one KV SSD based on tags, according to example embodiments as disclosed herein.

FIG. 10 is an example flow diagram illustrating a method for performing the read operation to read the values from selected KV SSDs based on the tags, according to example embodiments as disclosed herein.

Referring to FIG. 10, in operation 1001, the host processor 202 issues the read command including the key for reading the values/data from the selected at least one KV SSD.

In operation 1002, the host processor 202 checks in the KV cache for the values for issued key(s).

On determining the values are available in the KV cache for the issued key, in operation 1003, the host processor 202 can fetch the values from the KV cache.

On determining that the values are not available in the KV cache, in operation 1004, the host processor 204 determines the configurable number of KV SSDs from the plurality of KV SSDs (210a1-210an) for the issued key(s) using the consistent hashing function.

In operation 1005, the host processor 204 checks for the slab information of the issued key in the slab tables maintained for the configurable number of KV SSDs.

On determining the availability of the slab information for the issued key, in operation 1006, the host processor 202 identifies the at least one KV SSD comprising the values for the issued key. The availability of slab information for the issued key in the at least one slab table maintained for the at least one KV SSD indicates that the at least one KV SSD comprises the values for the issued key. In operation 1007, the host processor 202 broadcasts the issued key to the identified at least one KV SSD to obtain the values. Thus, broadcasting the issued key to the selected at least one KV SSD results in a faster search. In operation 1008, the host processor 1008 consolidates the values received from the at least one KV SSD for the issued key.

On determining that the slab information for the issued key is not available in the slab tables maintained for the configurable number of KV SSDs, in operation 1009, the host processor 202 filters the configurable number of KV SSDs based on the corresponding tags that match with the category of the key. In operation 1010, the host processor 202 broadcasts the issued key to the filtered at least one KV SSD of the configurable number of KV SSDs. In operation 1011, in response to the broadcasted issued key, the host processor 202 receives the values for the issued key from the filtered at least one KV SSD and consolidates the values for the issued key. In operation 1012, the host processor 202 updates the slab information for the issued key in the at least one slab table maintained for the filtered at least one KV SSD.

Consider an example scenario, wherein the host processor 202 is connected to 14 KV SSDs and each KV SSD of the 14 KV SSDs are tagged based on the values stored in the 14 KV SSDs. In an example herein, as illustrated in FIG. 10, a video tag can be associated with a KV SSD-1, a KV SSD-2, a KV SSD-7, a KV SSD-8, a KV SSD-9, a KV SSD-10, a KV SSD-13 and a KV SSD-14 since the values related to the videos are stored in these KV SSDs. A document tag can be assigned to a KV SSD-3, a KV SSD-4, the KV SSD-7, the KV SSD-8, the KV SSD-11, the KV SSD-12, the KV SSD-13 and the KV SSD-14. An image tag can be assigned to a KV SSD-5, a KV SSD-6, the KV SSD-9, the KV SSD-10, the KV SSD-11, the KV SSD-12, the KV SSD-13 and the KV SSD-14. Further, the host processor 202 issues the read command including the key to read the values from the at least one KV SSD among the 14 KV SSDs. In an example herein, the host processor 202 wants to read the values related to the videos.

For reading the values, the host processor 202 determines the configurable number of KV SSDs from the 14 KV SSDs using the consistent hashing function. In an example herein, the KV SSD-1, the KV SSD-2, the KV SSD-11, and the KV SSD-12 can be determined as the configurable number of KV SSDs for the issued key. Further, on determining that the slab information is not available for the issued key, the host processor 202 filters the configurable number of KV SSDs based on the tags. Since the host processor wants to read the values related to the videos, the at least one KV SSD assigned with the video tag can be selected. In an example herein, the KV SSD-1 and the KV SSD-2 can be selected from the configurable number of KV SSDs for reading the values. Then, the host processor 202 broadcasts the issued key to the KV SSD-1 and the KV SSD-2 for receiving the values for the issued key. Thus, reading the values from the selected KV SSDs increases speed of the read operation.

Figure 11:
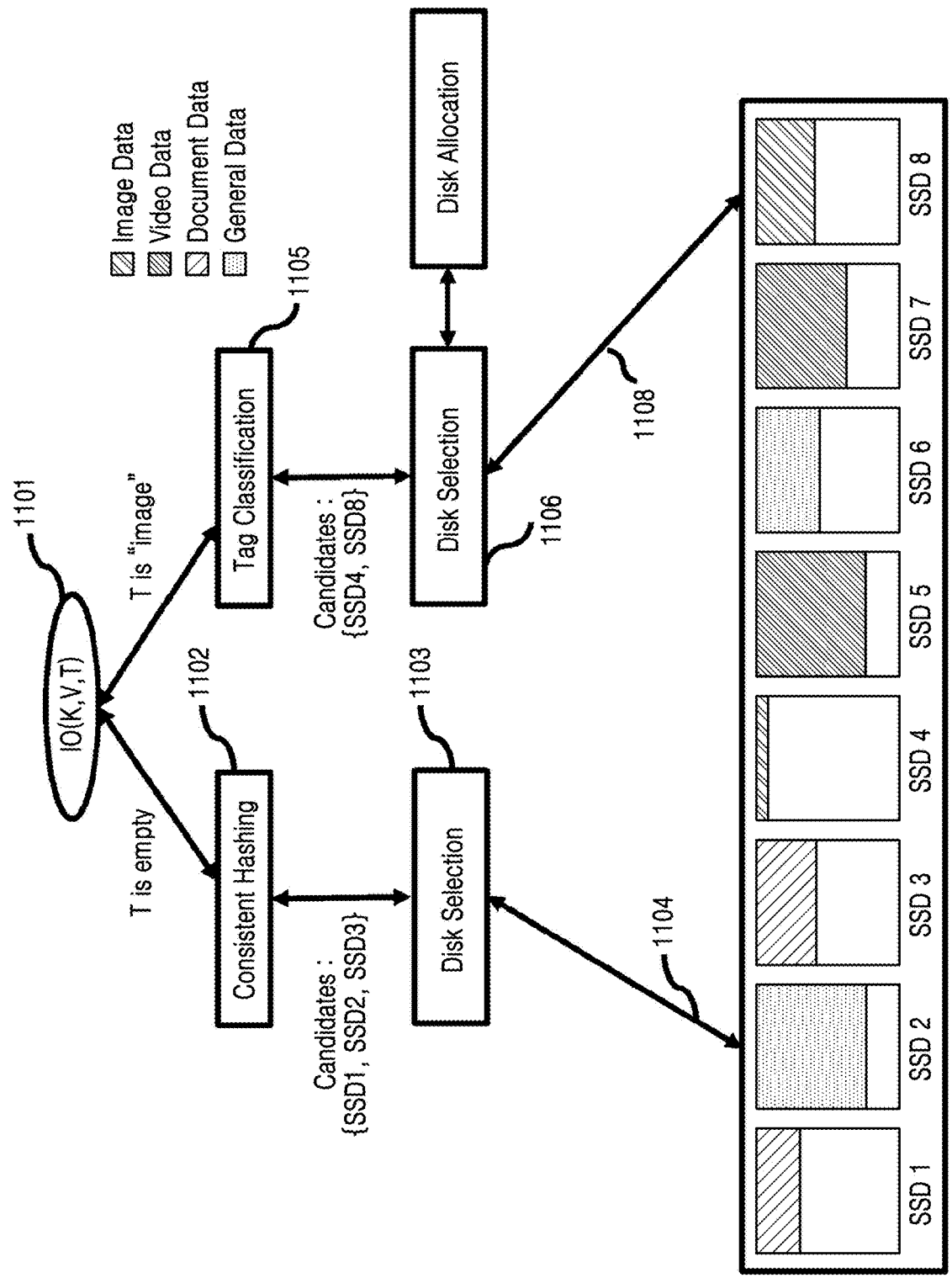
FIG. 11 is an example flow diagram illustrating a method for performing a write operation to store Key-Value pairs in selected at least one KV SSD, according to example embodiments as disclosed herein.

FIG. 11 is an example flowchart illustrating a method for performing the write operation to store the Key-Value pairs in the selected at least one KV SSD, according to example embodiments as disclosed herein.

Referring to FIG. 11, in operation 1101, the host processor 202 issues a write command including the Key-Value pair along with the tag (IO (K,V,T)).

On determining that the tag is empty, in operation 1102, the host processor 202 uses the consistent hashing function to determine the configurable number of KV SSDs from the plurality of KV SSDs (for example: 8 KV SSDs) for storing the Key-Value pair. In an example herein, a KV SSD1, a KV SSD2 and a KV SSD 3 can be determined as the configurable number of KV SSDs. In operation 1103, the host processor 202 analyzes the load information, the space availability, the bandwidth utilization and so on associated with the configurable number of KV SSDs to select the at least one candidate KV SSD for storing the Key-Value pair. In an example herein, the host processor 202 selects the KV SSD 2 as the candidate KV SSD, since the KV SSD2 is having the lowest number of keys (the load), the lowest space utilization and the highest bandwidth availability. In operation 1104, the host processor 202 stores the Key-Value pair into the KV SSD2.

On determining the tag associated with the issued Key-Value pair is an image tag, in operation 1105, the host processor 202 performs a tag classification to determine the configurable number of KV SSDs from the 8 KV SSDs which are including image data. In an example herein, the host processor 202 determines a KV SSD 4 and a KV SSD 8 are the configurable number of KV SSDs, since the KV SSD4 and the KV SSD 8 include the image data. In operation 1106, the host processor 202 obtains information about disk allocation (the load, the available space and the bandwidth information) from the slab tables of the KV SSD 4 and the KV SSD 8. Based on the information about the disk allocation, the host processor 202 selects the candidate KV SSD for storing the Key-Value pair. In an example herein, the host processor 202 selects the KV SSD 8 as the candidate KV SSD. In operation 1108, the host processor 202 stores the Key-Value pair into the KV SSD 8 and updates the information about disk allocation in the slab table maintained for the KV SSD 8.

Figure 12:
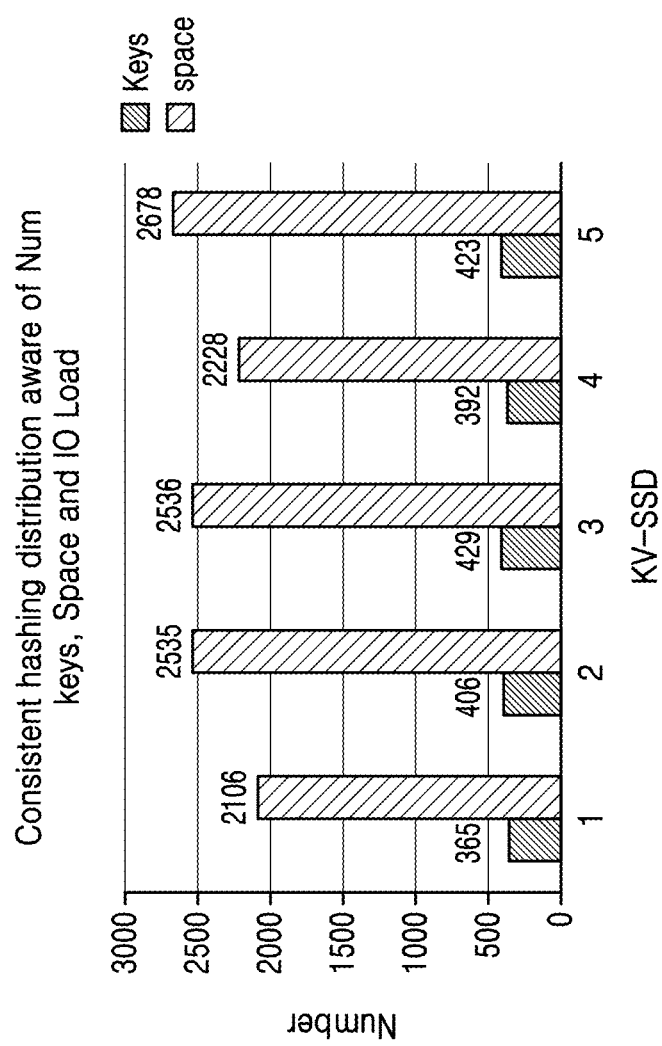
FIG. 12 is an example graph illustrating distribution of keys over a plurality of KV SSDs based on load balancing and available space, according to example embodiments as disclosed herein.

FIG. 12 is an example graph illustrating distribution of keys over the plurality of KV SSDs based on load balancing and available space, according to example embodiments as disclosed herein.

Referring to FIG. 12, example embodiments herein enable the host processor 202 to write the Key-Value pair(s) to the selected at least one KV SSD based on at least one of load, available space, bandwidth and so on. Thus, a number of keys and a memory space can be efficiently managed among the plurality of KV SSDs as illustrated in FIG. 12.

The example embodiments disclosed herein can be implemented through at least one software program running on at least one hardware device and performing network management functions to control the elements. The elements shown in FIGS. 2A, 2B, 5A, and 5B can be at least one of a hardware device, or a combination of hardware device and software module.

The example embodiments disclosed herein describe methods and systems for efficiently managing Key-Value Solid State Drives (KV SSDs). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. Example embodiments may be implemented through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The example embodiments described herein could be implemented partly in hardware and partly in software. Alternatively, the example embodiments may be implemented on different hardware devices, e.g. using a plurality of CPUs.

The foregoing description of specific example embodiments will so fully reveal the general nature of the example embodiments herein that others can, by applying current knowledge, readily modify and/or adapt for various applications such example embodiments without departing therefrom, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of example embodiments, those skilled in the art will recognize that the example embodiments herein can be practiced with modification within the spirit and scope of the example embodiments as described herein.

We claim:

1. A system comprising:
a plurality of Redundant Array of Independent Disks (RAID) groups, the plurality of RAID groups each including a plurality of Key-Value Solid State Drives (KV SSDs); and
a host processor coupled to at least one of the plurality of RAID groups, the host processor configured to,
derive slab information associated with at least one key of at least one Key-Value pair by performing a slab classification based on a size of the at least one key,
write the at least one Key-Value pair to at least one of the plurality of KV SSDs based on at least one of (i) the slab information associated with the at least one key, (ii) available space of the at least one KV SSD and (iii) a load of the at least one KV SSD, the at least one Key-Value pair being associated with a write command to write a data to the at least one KV SSD, and
read the data from the at least one KV SSD for at least one key of at least one read command based on at least one of a consistent hashing function and the slab information associated with the at least one key.

2. The system of claim 1, wherein the host processor is configured to,
determine a configurable number of KV SSDs from the plurality of KV SSDs for the at least one key using the consistent hashing function,
derive the slab information associated with the at least one key by performing the slab classification, by segregating the at least one key into at least one of a small slab, a medium slab and a large slab,
select the at least one KV SSD from the configurable number of KV SSDs based on at least one of (i) the derived slab information associated with the at least one key, (ii) available space of the configurable number of KV SSDs and (iii) load of the configurable number of KV SSDs, and
write the at least one Key-Value pair to the selected at least one KV SSD by,
splitting at least one value of the at least one Key-Value pair into a plurality of values of a chunk size, the chunk size based on the slab information associated with the at least one key, and
writing, in parallel, the plurality of values of the chunk size of the at least one Key-Value pair to the selected at least one KV SSD.

3. The system of claim 2, wherein the host processor is further configured to insert the slab information associated with the at least one key into at least one slab table maintained for the selected at least one KV SSD.

4. The system of claim 2, wherein the host processor is further configured to write the at least one Key-Value pair to the selected at least one KV SSD by,
determining if the at least one key of the at least one Key-Value pair exists in at least one slab table maintained for the selected at least one KV SSD,
checking if an update is available for the at least one key of the at least one Key-Value pair based on whether a change in the slab information associated with the at least one key exists, in response to the at least one key of the at least one Key-Value pair existing in the at least one slab table,
writing the at least one Key-Value pair to the selected at least one KV SSD, in response to the update not being available for the at least one key of the at least one Key-Value pair, and
performing at least one action in response to the update being available for the at least one key of the at least one Key-Value pair, the at least one action including,
checking if the at least one key of the at least one Key-Value pair exists in the selected at least one KV SSD by broadcasting the at least one key to the selected at least one KV SSD;
performing an update operation if the at least one key of the at least one Key-Value pair exists in the selected at least one KV SSD by,
issuing a delete instruction to the selected at least one KV SSD to remove the at least one key existing in the selected at least one KV SSD;
removing, from the at least one slab table maintained for the selected at least one KV SSD, the slab information associated with the at least one key associated with the delete instruction;
writing the at least one Key-Value pair to the selected at least one KV SSD;
updating the at least one slab table maintained for the selected at least one KV SSD by inserting the slab information associated with the at least one key of the written at least one Key-Value pair; and
acknowledging an update failure response if the at least one key of the at least one Key-Value pair does not exist in the selected at least one KV SSD.

5. The system of claim 1, wherein the host processor is configured to read the data from the at least one KV SSD by,
determining a configurable number of KV SSDs from the plurality of KV SSDs for the at least one key of the at least one read command based on the consistent hashing function,
broadcasting the at least one key of the at least one read command to the configurable number of KV SSDs, and
reading at least one value of the data from the at least one KV SSD of the configurable number of KV SSDs.

6. The system of claim 1, wherein the host processor is configured to read the data from the at least one KV SSD by,
determining a configurable number of KV SSDs from the plurality of KV SSDs for the at least one key of the at least one read command based on the consistent hashing function,
determining whether the slab information associated with the at least one key is available for the at least one key of the at least one read command in slab tables maintained for the configurable number of KV SSDs,
selecting the at least one KV SSD from the configurable number of KV SSDs, in response to the slab information associated with the at least one key being available for the at least one key,
broadcasting the at least one key of the at least one read command to the selected at least one KV SSD; and
reading at least one value of the data from the selected at least one KV SSD.

7. The system of claim 6, wherein the host processor is further configured to,
select the at least one KV SSD by filtering the configurable number of KV SSDs based on at least one tag, and
read the at least one value of the data by broadcasting the at least one key of the at least one read command to the selected at least one KV SSD.

8. The system of claim 1, wherein each of the plurality of KV SSDs comprises:
a plurality of Flash Translation Layer (FTL) cores; and
a controller coupled to the plurality of FTL cores, the controller configured to,
write the at least one Key-Value pair received from the host processor to at least one of the plurality of FTL cores based on at least one of the slab information associated with the at least one key, the available space of the at least one KV SSD and the load of the at least one KV SSD, and
read at least one value of the data from the at least one of the plurality of FTL cores for the at least one key received from the host processor based on at least one of the consistent hashing function and the slab information associated with the at least one key.

9. The system of claim 8, wherein the controller is further configured to,
determine a configurable number of FTL cores from the plurality of FTL cores for the at least one Key-Value pair received from the host processor based on the consistent hashing function,
select the at least one FTL core from the configurable number of FTL cores as a selected at least one FTL core based on at least one of the slab information associated with the at least one key, load of each of the configurable number of FTL cores and space available on each of the configurable number of FTL cores; and
write the at least one Key-Value pair to the at least one FTL core by,
splitting the at least one Key-Value pair into a plurality of values of a chunk size, the chunk size being based on the slab information associated with the at least one key; and
writing, in parallel, the plurality of values of the chunk size to the selected at least one FTL core.

10. The system of claim 8, wherein the controller is further configured to,
determine a configurable number of FTL cores from the plurality of FTL cores for the at least one key received from the host processor based on the consistent hashing function,
broadcast the at least one key to the configurable number of FTL cores;
read the at least one value from the configurable number of FTL cores; and
consolidate the at least one value of the data for transmitting to the host processor.

11. A method for managing Key-Value Solid State Drives (KV SSDs), the method comprising:

deriving, by a host processor, slab information associated with at least one key of at least one Key-Value pair by performing a slab classification based on a size of the at least one key;
writing, by the host processor, the at least one Key-Value pair to at least one of a plurality of KV SSDs of at least one Redundant Array of Independent Disks (RAID) group based on at least one of (i) the slab information associated with the at least one key, (ii) available space of the at least one KV SSD and (iii) a load of the at least one KV SSD, the at least one Key-Value pair being associated with a write command to write a data to the at least one KV SSD; and
reading, by the host processor, the data from the at least one KV SSD for at least one key of at least one read command based on at least one of a consistent hashing function and the slab information associated with the at least one key.

12. The method of claim 11, wherein the writing the at least one Key-Value pair to the at least one KV SSD comprises:
determining a configurable number of KV SSDs from the plurality of KV SSDs for the at least one key using the consistent hashing function;
deriving the slab information associated with the at least one key by performing the slab classification by segregating the at least one key into at least one of a small slab, a medium slab and a large slab;
selecting the at least one KV SSD from the configurable number of KV SSDs based on at least one of (i) the derived slab information associated with the at least one key, (ii) available space of the configurable number of KV SSDs and (iii) load of the configurable number of KV SSDs; and
writing the at least one Key-Value pair to the selected at least one KV SSD by,
splitting at least one value of the at least one Key-Value pair into a plurality of values of a chunk size, the chunk size based on the slab information associated with the at least one key, and
writing, in parallel, the plurality of values of the chunk size of the at least one Key-Value pair to the selected at least one KV SSD.

13. The method of claim 12, further comprising:
inserting, by the host processor, the slab information associated with the at least one key into at least one slab table maintained for the selected at least one KV SSD.

14. The method of claim 11, further comprising:
writing, by the host processor, the at least one Key-Value pair to the at least one KV SSD by,
determining if the at least one key of the at least one Key-Value pair exists in at least one slab table maintained for the selected at least one KV SSD,
checking if an update is available for the at least one key of the at least one Key-Value pair based on whether a change in the slab information associated with the at least one key exists, in response to the at least one key of the at least one Key-Value pair existing in the at least one slab table,
writing the at least one Key-Value pair to the selected at least one KV SSD, in response to the update not being available for the at least one key of the at least one Key-Value pair, and
performing at least one action in response to the update being available for the at least one key of the at least one Key-Value pair, the at least one action including, checking if the at least one key of the at least one Key-Value pair exists in the selected at least one KV SSD by broadcasting the at least one key to the selected at least one KV SSD;

performing an update operation if the at least one key of the at least one Key-Value pair exists in the selected at least one KV SSD by, issuing a delete instruction to the selected at least one KV SSD to remove the at least one key existing in the selected at least one KV SSD;

removing, from the at least one slab table maintained for the selected at least one KV SSD, the slab information associated with the at least one key associated with the delete instruction;

writing the at least one Key-Value pair to the selected at least one KV SSD;

updating the at least one slab table maintained for the selected at least one KV SSD by inserting the slab information for the at least one key of the at least one Key-Value pair written to the selected at least one KV SSD; and acknowledging an update failure response if the at least one key of the at least one Key-Value pair does not exist in the selected at least one KV SSD.

15. The method of claim 11, wherein the reading the data from the at least one KV SSD comprises:

determining a configurable number of KV SSDs from the plurality of KV SSDs for the at least one key of the at least one read command based on the consistent hashing function;

broadcasting the at least one key of the at least one read command to the configurable number of KV SSDs; and reading at least one value of the data from the at least one KV SSD of the configurable number of KV SSDs.

16. The method of claim 11, wherein the reading the data from the at least one KV SSD comprises:

determining, by the host processor, a configurable number of KV SSDs from the plurality of KV SSDs for the at least one key of the at least one read command based on the consistent hashing function;

determining, by the host processor, whether the slab information associated with the at least one key is available for the at least one key of the at least one read command in slab tables maintained for the configurable number of KV SSDs;

selecting, by the host processor, the at least one KV SSD from the configurable number of KV SSDs, in response to the slab information associated with the at least one key being available for the at least one key;

broadcasting, by the host processor, the at least one key of the at least one read command to the selected at least one KV SSD; and reading at least one value of the data from the selected at least one KV SSD.

17. The method of claim 11, wherein the reading the data from the at least one KV SSD comprises:

determining, by the host processor, a configurable number of KV SSDs from the plurality of KV SSDs for the at least one key of the at least one read command based on the consistent hashing function;

selecting the at least one KV SSD by filtering, by the host processor, the configurable number of KV SSDs based on at least one tag; and reading at least one value of the data by broadcasting, by the host processor, the at least one key of the at least one read command to the selected at least one KV SSD.

18. The method of claim 11, further comprising:

writing, by a controller of the selected at least one KV SSD, the at least one Key-Value pair received from the host processor to at least one of a plurality of FTL cores based on at least one of the slab information associated with the at least one key, the available space of the at least one KV SSD and the load of the at least one KV SSD; and reading, by the controller, at least one value of the data from the at least one of the plurality of FTL cores for the at least one key received from the host processor based on at least one of the consistent hashing function and the slab information associated with the at least one key.

19. The method of claim 18, wherein the writing the at least one Key-Value pair to the at least one FTL core comprises:

determining a configurable number of FTL cores from the plurality of FTL cores for the at least one Key-Value pair received from the host processor based on the consistent hashing function;

selecting the at least one FTL core from the configurable number of FTL cores as a selected at least one FTL core based on at least one of the slab information associated with the at least one key, load of each of the configurable number of FTL cores and space available on each of the configurable number of FTL cores; and writing the at least one Key-Value pair received from the host processor to the selected at least one FTL core by, splitting at least one Key-Value pair into a plurality of values of a chunk size, the chunk size being defined based on the slab information associated with the at least one key; and writing, in parallel, the plurality of values of the chuck size to the selected at least one FTL core.

20. The method of claim 18, wherein reading the at least one value from the at least one FTL core includes:

determining a configurable number of FTL cores from the plurality of FTL cores for the at least one key received from the host processor based on the consistent hashing function;

broadcasting the at least one key to the configurable number of FTL cores;

reading the at least one value from the configurable number of FTL cores; and consolidating the at least one value of the data for transmitting to the host processor.

* * * * *